(12) United States Patent
Panosian et al.

(10) Patent No.: US 11,227,346 B2
(45) Date of Patent: Jan. 18, 2022

(54) DUAL LASER MEASUREMENT DEVICE AND ONLINE ORDERING SYSTEM USING THE SAME

(71) Applicants: Michael H. Panosian, Irvine, CA (US); Joshua M. Keeler, Irvine, CA (US)

(72) Inventors: Michael H. Panosian, Irvine, CA (US); Joshua M. Keeler, Irvine, CA (US)

(*) Notice: Subject to any disclaimer, the term of this patent is extended or adjusted under 35 U.S.C. 154(b) by 0 days.

(21) Appl. No.: 17/156,521

(22) Filed: Jan. 22, 2021

(65) Prior Publication Data

US 2021/0383488 A1    Dec. 9, 2021

Related U.S. Application Data

(63) Continuation of application No. 17/088,481, filed on Nov. 3, 2020, which is a continuation-in-part of application No. 16/506,750, filed on Jul. 9, 2019, now Pat. No. 11,037,315.

(60) Provisional application No. 62/695,286, filed on Jul. 9, 2018.

(51) Int. Cl.
*G06Q 50/08* (2012.01)
*G06Q 30/06* (2012.01)
*G01B 11/28* (2006.01)
*G01B 11/02* (2006.01)

(52) U.S. Cl.
CPC .......... *G06Q 50/08* (2013.01); *G01B 11/02* (2013.01); *G01B 11/285* (2013.01); *G06Q 30/0621* (2013.01); *G06Q 30/0641* (2013.01)

(58) Field of Classification Search
CPC ............ G06Q 50/08; G06Q 30/0621; G06Q 30/0641; G01B 11/02; G01B 11/285
See application file for complete search history.

(56) References Cited

U.S. PATENT DOCUMENTS

| | | | |
|---|---|---|---|
| 9,551,575 B2* | 1/2017 | Bridges | G01S 17/86 |
| 9,752,863 B2 | 9/2017 | Hinderling | |
| 9,753,126 B2* | 9/2017 | Smits | G01S 17/10 |
| 2005/0280802 A1* | 12/2005 | Liu | G01S 17/08 |
| | | | 356/5.01 |
| 2016/0187120 A1* | 6/2016 | Lin | G01S 7/4813 |
| | | | 356/627 |
| 2018/0356525 A1 | 12/2018 | Barbier et al. | |

(Continued)

OTHER PUBLICATIONS

He et al., "An E-Commerce Platform for Industrialized Construction Procurement Based on BIM and Linked Data", 2018, Sustainability 2018, 10, 2613 (Year: 2018).*

(Continued)

*Primary Examiner* — Regis J Betsch
(74) *Attorney, Agent, or Firm* — Arjomand Law Group; Farjam Majd

(57) ABSTRACT

A system and a method are disclosed including a dual laser measurement device (DLMD) coupled with a mobile computing device to measure dimensions of a building or other structure, calculate other quantities based on the measured dimensions, select building construction or finishing material, order the material, and save the list of the measured dimensions and ordered materials in a data storage device. All steps of this process from measurement to ordering material may be performed using a DLMD app running on the mobile computing device.

20 Claims, 25 Drawing Sheets

Front View

(56) References Cited

U.S. PATENT DOCUMENTS

2020/0013177 A1    1/2020  Panosian

OTHER PUBLICATIONS

Nguyen et al., "Application of BIM and 3D Laser Scanning for Quantity Management in Construction Projects", Advances in Civil Engineering vol. 2020, Article ID 8839923 (Year: 2020).*
Blais et al., "Range error analysis of an integrated time-of-flight, triangulation, and photogrammetric 3D laser scanning system", Proc. SPIE 4035, Laser Radar Technology and Applications V, (Sep. 5, 2000) (Year: 2000).*
Olsen et al., "Quantity Take-Off Using Building Information Modeling (BIM), and Its Limiting Factors", Procedia Engineering 196 ( 2017 ) 1098-1105 (Year: 2017).*
Rocha et al., "A Scan-to-BIM Methodology Applied to Heritage Buildings", 2020, Heritage 2020, 3, 47-65 (Year: 2020).*
Cheok et al., 3D Imaging Systems for Manufacturing, Construction, and Mobility, NIST TN 1682, Dec. 2010 (Year: 2010).*
Costa et al., "BIM-Based E-Procurement: An Innovative Approach to Construction E-Procurement", The Scientific World Journal vol. 2015, Article ID 905390, 15 pages (Year: 2015).*
Gleason, "Laser Scanning for an Integrated BIM", Lake Constance 5D-Conference 2013 (Year: 2013).*
Grilo et al., "Challenging electronic procurement in the AEC sector: A BIM-based integrated perspective", Automation in Construction 20 (2011) 107-114 (Year: 2011).*
Denisov et al., "Three-Beam Triangulating Sensor", IOP Conf. Series: Materials Science and Engineering 86 (2015) (Year: 2015).*

* cited by examiner

Side View, Section A-A

US 11,227,346 B2

DUAL LASER MEASUREMENT DEVICE AND ONLINE ORDERING SYSTEM USING THE SAME

CROSS-REFERENCE(S) TO RELATED APPLICATION(S)

This application is a continuation of U.S. patent application Ser. No. 17/088,481, filed on 3 Nov. 2020, which is a continuation-in-part (CIP) of U.S. application Ser. No. 16/506,750, filed on 9 Jul. 2019, entitled "DUAL LASER MEASUREMENT DEVICE AND ONLINE ORDERING SYSTEM USING THE SAME", claiming the benefit of the Provisional application No. 62/695,286, filed on 9 Jul. 2018, the disclosures of which are hereby expressly incorporated by reference in their entirety, and the filing date of which is hereby claimed under 35 U.S.C. § 120.

TECHNICAL FIELD

This application relates generally to measurement devices. More specifically, this application relates to a dual laser measurement device (DLMD) for measuring distance, used as a standalone device or with a smartphone.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
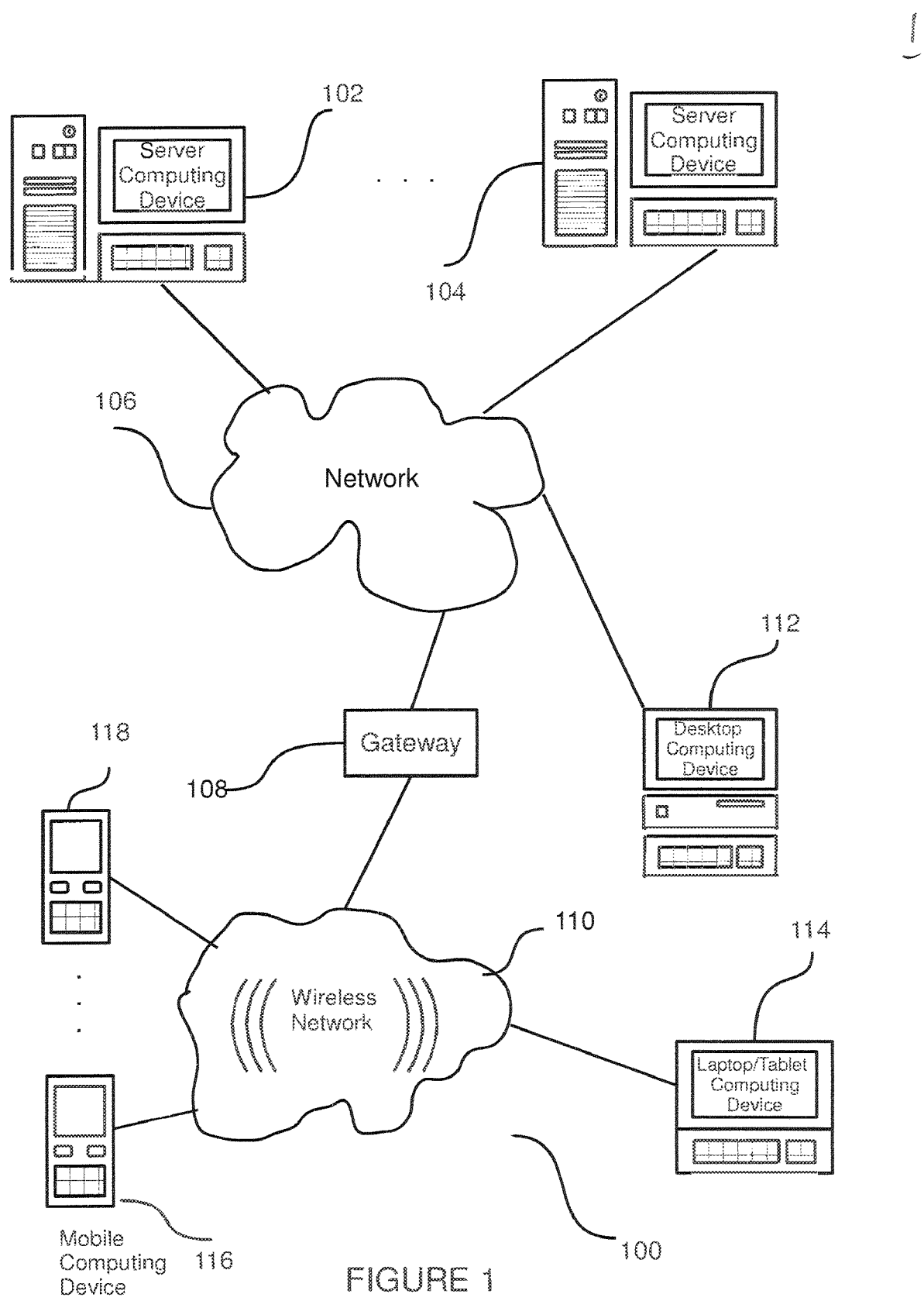
FIG. 1 shows an embodiment of a network computing environment wherein the disclosure may be practiced.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular DLMD app screens it will be appreciated that the disclosure may be used with other types of DLMD app screen configurations.

Briefly described, a system and a method are disclosed including a DLMD coupled with a mobile computing device to measure dimensions of a building or other structure, calculate other quantities based on the measured dimensions, select building construction or finishing material, order the material, and save the list of the measured dimensions and ordered materials in a data storage device. All steps of this process from measurement to ordering material may be performed using the DLMD app as further described below with reference to the figures.

In various embodiments, a computer-implemented integrated system for construction product purchase is disclosed including a mobile hand-held computing device, a dual laser device coupled with the mobile hand-held computing device via a data interface, a DLMD app installed on the mobile hand-held computing device, the dual laser app including a laser activation button to cause the dual laser device to simultaneously cast laser beams in opposite directions to measure a distance between two points. Also included are a product category selection interface to select a product category for a construction project, a product selection interface to select specific products for the construction project, and a product ordering interface to order the specific products from a supplier.

In various embodiments, a measurement device is disclosed including a laser measurement attachment coupled with a mobile hand-held computing device, and at least one photodetection units coupled to each of opposite sides of the laser measurement attachment, the at least one photodetection units on each of the opposite sides of the laser measurement attachment to cast multiple laser beams, each of the multiple laser beams cast at different angles with respect to the other laser beams.

In various embodiments, a computer-implemented method for construction product purchase is disclosed including selecting a product category for measurement using a DLMD app running on a mobile hand-held computing device, activating a dual laser device to cast multiple beams on opposite sides of the dual laser device to take distance measurements for the selected product category, transmitting the distance measurements to the mobile handheld computing device; selecting specific products to purchase using the DLMD app, and purchasing the selected products using the DLMD app.

Building contractors, construction crews, and private do-it-yourself (DIY) people generally have to go through a similar process as outlined above. For example, a contractor that wants to continue construction on a building, remodel a room or kitchen, paint a room, or do plumbing and electrical work in a house has to go through the process of measuring the dimensions of walls, floors, windows, and the like, select appropriate material such as paint and lumber for the task at hand, and order the selected material from a building material supplier or a hardware store.

This is a time-consuming and disjoint process. Each step in this process is done using different tools, at different times, and often by different people. In a disjoint process where the tools are not integrated, various information have to be communicated across the separate steps. For example, a contractor managing a construction project. may measure the distances needed carefully and record the measurements. After that, the contractor may use the measurements to estimate the surface areas of the walls and floors or the perimeter of a room. Next, the contractor may have to visit a hardware store or browse its website to see what product options are available. After that, the contractor has to visit the store or order products online on the website or by phone to obtain the material needed for the project. Each of these steps may have to be performed by a different contractor. For example, one contractor may perform the measurements while another one may select the material and still another contractor may go and purchase the material. To accomplish these tasks the contractors have to provide various data to the other contractors, which may be error prone and time consuming. For example, ordering the wrong amount of paint or the wrong color of paint causes delays and increases the cost of the project.

A number of laser devices are available on the market that are used to measure distances. As noted above, the measurement of distances is one step in the overall process of carrying out construction projects. The rest of the steps are not directly related to the laser measurement devices as they exist today and these devices play no role in performing the other steps beyond measurement. These devices simply produce the point-to-point measurements, which are then passed on to the next stages of the project. The laser devices also do not automatically ensure that the distances measured are perpendicular distances between two parallel walls. The person using the measurement device may use other devices, such as levels, to measure a perpendicular distance, but the laser device itself does not perform this function automatically. Hence, accuracy of measurement may be compromised when the shortest distance between two surfaces are being measured.

Therefore, there is a need for a device that provides a high-integration interface delivering highly integrated services for construction projects to reduce project time, increase project accuracy, reduce costs and increase overall efficiency.

Illustrative Operating Environment

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), $4^{th}$ (4G), and most recently $5^{th}$ (5G) generation radio access for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, Bluetooth Low Energy (LE), High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

In various embodiments, the arrangement of system 100 includes components that may be used in and constitute various networked architectures. Such architectures may include peer-to-peer, client-server, two-tier, three-tier, or other multi-tier (n-tier) architectures, MVC (Model-View-Controller), and MVP (Model-View-Presenter) architectures among others. Each of these are briefly described below.

Peer to peer architecture entails use of protocols, such as P2PP (Peer To Peer Protocol), for collaborative, often symmetrical, and independent communication and data transfer between peer client computers without the use of a central server or related protocols.

Client-server architectures includes one or more servers and a number of clients which connect and communicate with the servers via certain predetermined protocols. For example, a client computer connecting to a web server via a browser and related protocols, such as HTTP, may be an example of a client-server architecture. The client-server architecture may also be viewed as a 2-tier architecture.

Two-tier, three-tier, and generally, n-tier architectures are those which separate and isolate distinct functions from each other by the use of well-defined hardware and/or software boundaries. An example of the two-tier architecture is the client-server architecture as already mentioned. In a 2-tier architecture, the presentation layer (or tier), which provides user interface, is separated from the data layer (or tier), which provides data contents. Business logic, which processes the data may be distributed between the two tiers.

A three-tier architecture, goes one step farther than the 2-tier architecture, in that it also provides a logic tier between the presentation tier and data tier to handle application data processing and logic. Business applications often fall in and are implemented in this layer.

MVC (Model-View-Controller) is a conceptually many-to-many architecture where the model, the view, and the controller entities may communicate directly with each other. This is in contrast with the 3-tier architecture in which only adjacent layers may communicate directly.

MVP (Model-View-Presenter) is a modification of the MVC model, in which the presenter entity is analogous to the middle layer of the 3-tier architecture and includes the applications and logic.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

In various embodiments, the client computing devices 112-118, the networks 106 and 110, and server computing devices 102 and 104 may operate in real-time. As generally known in the relevant computing arts, the term "real-time" may mean one or more of several operating characteristics. One aspect of real-time is having computing deadlines, often measured in milliseconds or microseconds, by which a task must be completed. For example, with a deadline of 4 milliseconds from request time, fetching a data record from a database in under 4 milliseconds satisfies the deadline, and hence, would be considered as real-time performance in the particular case so defined. Another aspect of real-time computing is that data at one location in memory, storage, display, or record is updated by a computing device at substantially the same rate as new data is received by the computing device from other sources. For example, if financial stock information is received by a computing device at a particular rate, such as 10 data records per second, then if the display of such data is also updated at the same rate on a display screen, then the real-time requirement would be considered as satisfied. Yet another aspect of real-time computing is the control of a process, physical or virtual (software process), in which data or signals processed and/or provided by a computing device must reach the process before a particular step in the process is over and terminated. For example, if a computing device in a car, such as a microcontroller, is controlling the engine gas intake via the fuel injector, the signal cannot reach the fuel injector after the engine gas intake valve is closed. The signal must reach the fuel injector before the step of gas intake in the engine working cycle is completed to control flow of gas into the engine. In this aspect, the deadline for computing is set by the duration of a process step, not by a fixed time constant.

Illustrative Computing Device Configuration

Figure 2:
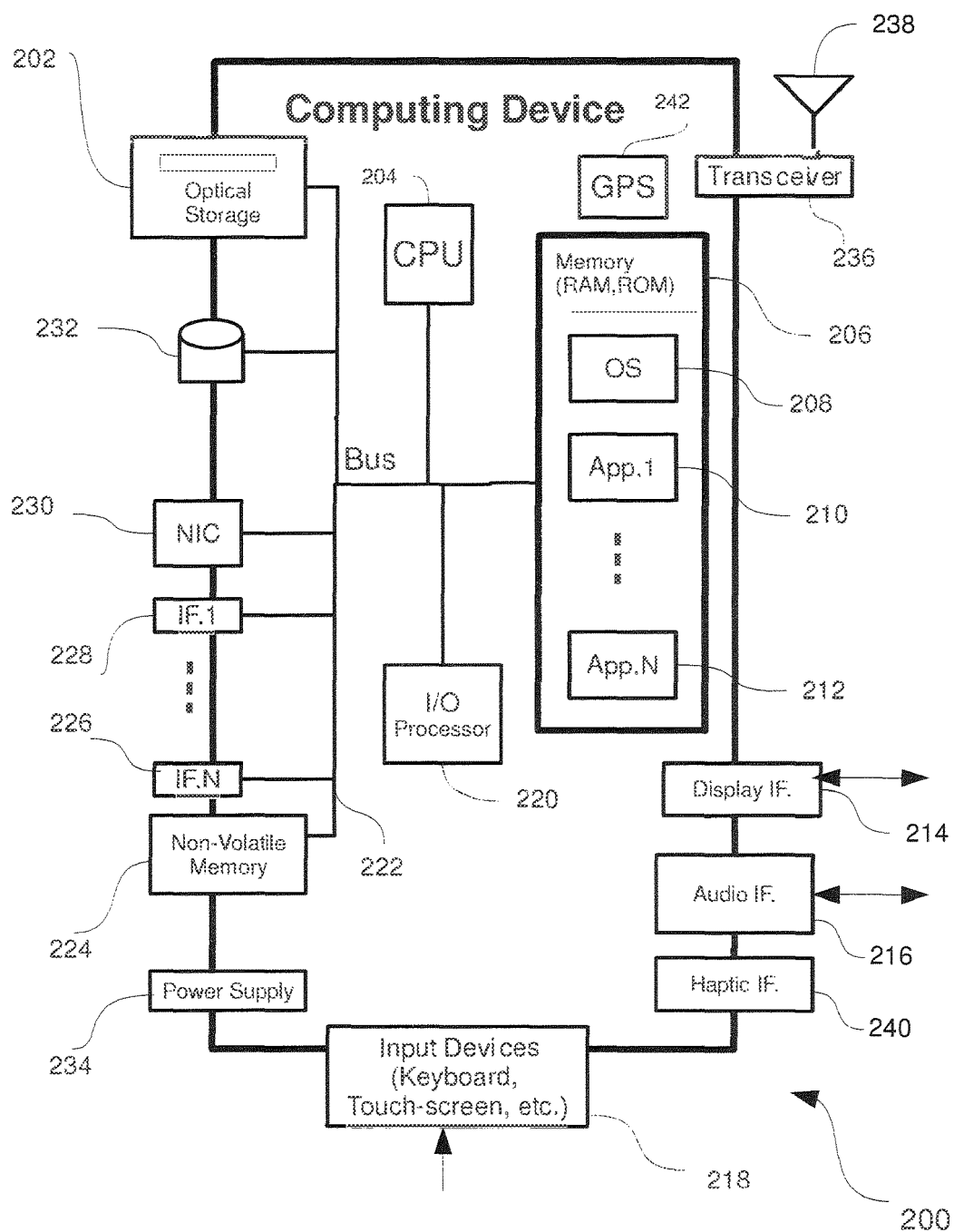
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs and/or software modules/components 210-212. Such software modules and components may be stand-alone application software or be components, such as DLL (Dynamic Link Library) of a bigger application software. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client-side and/or mobile communication operating system such as Windows Mobile™, Android®, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like.

Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may be the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC (Media Access Control) address.

Figure 3:
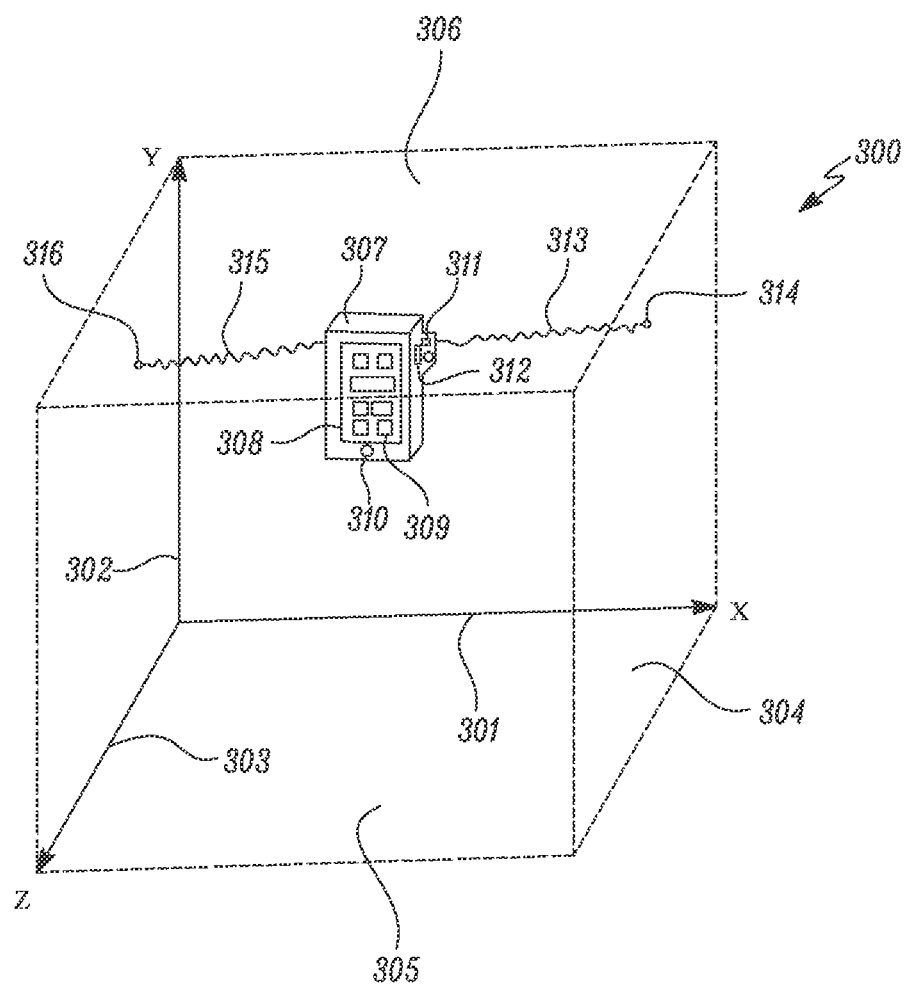
FIG. 3 shows an example measurement arrangement using a DLMD device, coupled with a computing device similar to the computing device described with respect to FIG. 2 above, to measure dimensions of a building.

FIG. 3 shows an example measurement arrangement 300 using a DLMD device, coupled with a computing device similar to the computing device described with respect to FIG. 2 above, to measure dimensions of a building. In various embodiments, the measurement arrangement 300 includes a reference frame with a designated X-axis 301, Y-axis 302, and Z-axis 303 defining part of a 3-D space or room with walls 304, floor 305, and ceiling 306. A DLMD 307, coupled with a mobile computing device 308, is used to cast laser beams 313 and 315 to points 314 and 316, respectively, on opposite walls of the room. The DLMD 307 may have multiple laser (light) sources 311 and laser detectors 312. The mobile computing device 308 may include software icons 309 for apps and hardware buttons 310.

In various embodiments, DLMD 307 is designed to be coupled with mobile computing device 308 to transmit laser measurement data to the mobile computing device 308 for further calculations, analysis and processing. The laser light sources may be located on opposite sides of the DLMD 307, facing opposite directions 180 degrees apart to simultaneously measure a distance between two opposite walls of a room from any point in the room. This way, there is no need to go one wall or one end of a measured distance or line with a laser device and shine a laser beam to the other end of the line being measured. The DLMD 307 may be located at any point along the (1-D) line being measured and simultaneously measure the distance from the DLMD 307 to both endpoints of the line. Adding the two measured distances from the DLMD 307 to the two endpoints of the line being measured yields the length of the line. This flexibility of locating DLMD 307 anywhere along a line being measured increases efficiency and accuracy because it removes the dependency on the position or placement of the laser device during the measurement process.

In various embodiments, the DLMD 307 may be coupled with the mobile computing device 308 via various wired, direct, or wireless interfaces, as further described with respect to FIG. 2 above and FIG. 5 below.

Figure 4A:
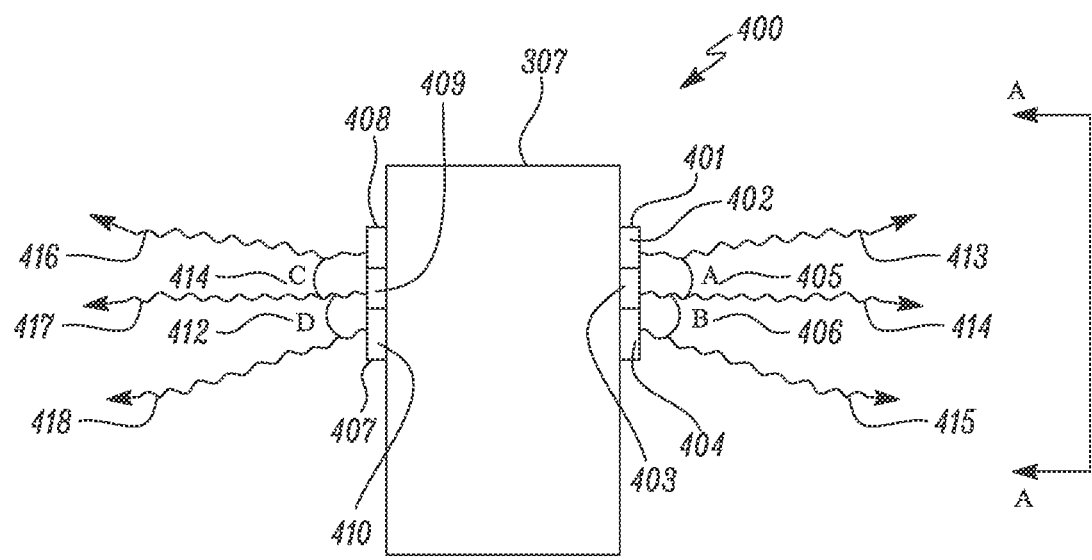
FIG. 4A shows example details of a front view of the example DLMD device of FIG. 3.

FIG. 4A shows example details of a front view 400 of the example DLMD device of FIG. 3. In various embodiments, DLMD 307 includes laser measurement modules 401 and 407, each having laser photodetection units 402, 403, 404 and 408, 409, 410, respectively. Each of the photodetection units 402-404 and 408-410 includes a laser light emitter or source and a light detection device, as further described with respect to FIG. 4B. Each of the laser emitters in the photodetection units 402-404 and 408-410 casts a separate laser beam 413, 414, 415 and 416, 417, 418, respectively at the target endpoints of a linear distance being measured. Each laser beam is cast at a slightly different angle with respect to the adjacent laser beam, separated by angles 405 (A), 406 (B) and 414 (C), and 412 (D), as shown in the figure.

In various embodiments, the laser emitters may generate laser beams having the same frequency or different frequencies. Having the same laser frequency reduces DLMD 307 device design complexity and configuration overhead, and possibly reduce cost because of the higher quantity of the same device. However, the accuracy may suffer to some extent because the light detection devices may detect reflection of adjacent laser beams. Also, the practical distance of measurement may be reduced due to the higher scattering of reflected light coming back from longer distances.

Having a different frequency allows the respective light detection devices to be tuned to the respective frequency to be detected on reflection and hence reduce the possibility of detecting the reflection of the wrong laser beams. This way accuracy and range (distance) of measurements may be improved.

The laser measurement modules 401 and 407 may be located at different locations on the DLMD 307. In one embodiment, as mostly discussed herein, the laser measurement modules 401 and 407 are located to face opposite directions by 180 degrees between them. In another embodiment, the laser measurement modules may be placed on DLMD 307 to face directions that are 90 degrees apart (not shown in the figure), allowing simultaneous measurement of two perpendicular dimensions. In such configuration, the angle between the directions the laser measurement modules are facing is 90 degrees. Using this embodiment, DLMD 307 may be placed at the corner of a room where two adjacent walls meet and measure both walls at the same time. In yet another configuration, the laser measurement modules may be positioned at a variable angle with respect to each other. In this configuration they can be placed at 45 degrees, 90 degrees, 180 degrees, or any other angle with respect to each other. This embodiment allows quick measurement of non-perpendicular walls (that is, not square or rectangular rooms) in one measurement rather than two separate measurements, one for each wall.

In various embodiments, a laser measurement device may operate based on one of several methods. One method is time of flight (TOF) in which the round trip travel time of a laser beam and its reflection from a target of measurement is measured and based on the speed of light the distance to the target of measurement (an object) is calculated. Another method is single-beam triangulation in which a collimated laser emitter is used to illuminate the target of measurement. A camera lens laterally displaced from the collimated laser light source will receive the reflected laser beams returning from the target and project it behind the camera lens on an array of light detectors. Knowing the displacement distance between the laser emitter and the camera lens, and the position on the array of detectors of the light detector that sensed the reflected beam, allows the calculation of the distance to the target, using similar triangles geometry. Still another method of measuring distance using lasers is phase shift detection. In this method, the optical power is modulated with a constant frequency. A sine wave of frequency generated by a main oscillator of a laser generation circuitry modulates the DC current of a laser diode. After the reflection of the laser beam from the target, an avalanche photodiode collects a part of the laser beam. Measurement of the distance is calculated based on the phase shift between the photoelectric current of the avalanche photodiode and the modulated emitted laser beam.

Figure 4B:
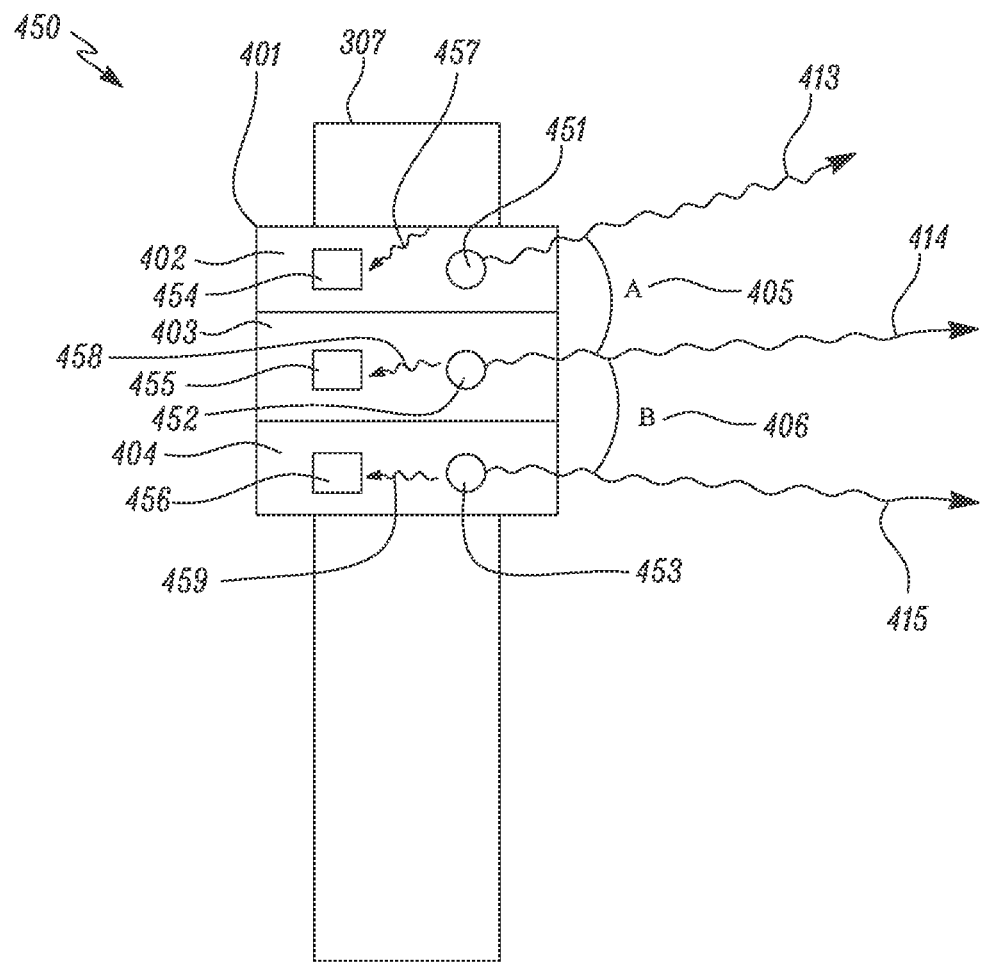
FIG. 4B shows example details of a section A-A side view of the example DLMD device of FIG. 4A.

FIG. 4B shows example details of a section A-A side view 450 of the example DLMD device of FIG. 4A. In various embodiments, the side view 450 includes DLMD 307 with laser measurement module 401 having laser photodetection units 402, 403, and 404. These laser photodetection units include laser emitters 451, 452, and 453, and light detection devices 454, 455, and 456, respectively. The light detection devices 454-456 receive and detect reflected light rays 457, 458, and 459, respectively, resulting from laser beams 413, 414, and 415, respectively, after hitting a measurement target object, such as a wall.

In various embodiments, the laser emitters 451-453 are configured and installed to face slightly different directions as signified by the angles 405 (A) and 406 (B). This configuration allows casting the laser beams 413-415 at slightly different angle to the measurement target object, for example, a wall, a column, a door and the like. In a distance measurement using dual lasers, the distance between two opposite sides of a structure, such as two opposite walls, the intention is often to measure the perpendicular distance between the two opposite walls so the floor area or other straight distance along the room may be obtained. For example, if the length of water pipes or electrical wires needed passing between the two opposite walls is being measured, then the shortest distance, which is the perpendicular distance between the two opposite walls is needed. This is further described with respect to FIGS. 4C and 4D.

To obtain the perpendicular distance between two opposite surfaces, us as walls, the three different laser beams 413-415 may be used. Each of the laser beams 413-415 hits the target object (e.g., wall surface) at a different point and measures a different distance from the DLMD 307. These different distances can be used in a triangulation calculation to calculate the perpendicular distance between the two opposite surfaces. The perpendicular distance is generally measured between two parallel planes, in a mathematical sense. An example of two parallel planes is two opposite and parallel walls in a room. The triangulation process is further described with respect to FIG. 4E.

In some measurements, the objective may be to measure the length of a line between two arbitrary points at some distance apart. For example, one end of the line may be at the corner of a door and the other end may be at a corner of window not being in a plane parallel to the plane of the door. So, triangulation is not used in the case of this point-to-point, not necessarily perpendicular, measurement. In such cases, the triangulation feature may be turned off, for example by using one of the laser emitters, such as the center laser emitter 452.

Because of the inherent inaccuracies involved in handheld laser measurement devices, a single measurement may not be reliable or accurate enough for a desired level of precision. The source of such inaccuracies often come from shaking of hand holding the DLMD 307 during measurement, poor visibility during observation of where the laser beams 413-415 are cast and where the laser dots appears on the measurement target objects, and the like. To reduce inaccuracy and increase reliability and repeatability of measurement, the laser beams 413-415 may be cast tens or hundreds of times per second (for example, 50 to 500 times per second) on the measurement target object using a rapid sequence of laser pulses, forming a pulse train. The measured distances obtained from each of the pulses in the pulse train may be averaged to obtain the final measurement.

Other calculations may be performed instead of averaging to obtain the final measurement. For example, certain criteria may be used to weigh each one of the measurements resulting from each of the pulses and then apply a weighted average calculation to determine the final measurement. For instance, the weight assigned to each measurement may be based on the strength of the reflected beams 457-459 detected by the light detection devices 454-456. Another method of determining the final measurement may be the application of a voting algorithm, such as Boyer-Moore majority vote algorithm. In voting algorithms, one input, event, or measurement of interest having different observed values when repeated, is obtained and the most frequently occurring value in the multiple tries is selected as the most likely or most representative value of the input or event.

In some embodiments, the laser emitters 451-453 may each have the same wavelength or frequency as the other laser emitters. In such embodiments, the light detection devices 454-456 may be physically smaller than those in photodetection units used in single-unit configuration (as opposed to multiple or three units shown in FIG. 4B) so each can be more discriminating regarding which reflected beam it detects and avoid cross-feeding from other photodetection units. The light detection devices 454-456 may also be pointed in the direction of their respective laser beams 413-415 to further enhance their selective detection of the respective reflected beams 457-459.

In some embodiments, the laser emitters 451-453 may each have a different wavelength and frequency. In such embodiments, each of the light detection devices 454-456 may be tuned to detect the same frequency as of its corresponding laser emitter. This way, the cross detection of other reflected beams is reduced. The size of the light detection devices 454-456 may also be increased to enhance the capturing of reflected beams 413-415 without risk of detecting the reflected beams of other laser emitters resulting in erroneous measurements, especially for triangulation calculations.

In some embodiments, multiple laser beams on each side of the opposite sides of DLMD 307 may be used, as shown in FIG. 4A, while in other embodiments, a single laser beam may be used on each side of the DLMD. In the latter embodiments, the single laser beam on each side may be dynamically and at a fast rate pointed in slightly different directions in a time-slice based method to effectively perform the same function as multiple laser beams that are fixed to point at different directions. A time-slice is a predetermined short time segment on the order of a few microseconds to a few milliseconds. In computer processing and digital timing, both at hardware level and at software level for high-performance systems, each time-slice may be used to run a particular process. Multi-threaded software systems running on a single CPU use time-slice to allocate processing time to different software threads and/or processes running in parallel. A time-slice is actually a fast serial operation, not parallel, because only one process can run on the CPU (or only one action performed by any hardware device) at a time. However, when compared with longer time scales at application level, multiple low-level processes being switched at much higher speeds (one or more orders of magnitude higher speed) appear to be running in parallel. So, if the time-slice is short enough for practical purposes, for example, compared with the time that the shaking of human hand takes, which may be on the order of a few tremors per second while trying to hold an object unsupported in the air, a laser beam changing angles thousands of times per second will appear to be and act like several simultaneous laser beams.

The changing of angle or direction a laser beam is cast may be changed mechanically, electrically, or optically. Mechanically, a high rate vibration device may be used to physically move a directionally constrained laser beam. Electrically, different laser semiconductor segments may be excited at the desired rate to shine the laser in different directions. Optically, a mirror arrangement may be used to deflect the laser at different angles. In these single photodetector unit embodiments, the cost and size of the device may be reduced.

In some embodiments, the multiple laser beams on the opposite sides of DLMD 307 may be produced by a single laser light source (and a single light detector) using the electrical, mechanical, or optical methods described above. For example, laser beams on the opposite sides of DLMD 307 may be generated by the single laser light source and cast in opposite directions through the opposite sides of DLMD 307 and/or at different angles with respect to other laser beams cast previously, using a mechanically rotating mirror. For such configurations using one laser source for casting multiple laser beams, a time-sliced processing may have to be used to differentiate the laser beams cast towards different directions.

In various embodiments, multiple laser light sources (emitters) and light detection devices may be integrated into one physical package that is segmented or partitioned to behave like multiple photodetection units. In other embodiments, discrete laser emitters may be used while the light detection devices may be integrated to detect the reflection of each of the discrete laser emitters independently. For example, photodetection devices may be implemented and manufactured on the same substrate to reduce cost and increase precision of detection. The partitioned photodetection device may have dual or quad segments.

Figure 4C:
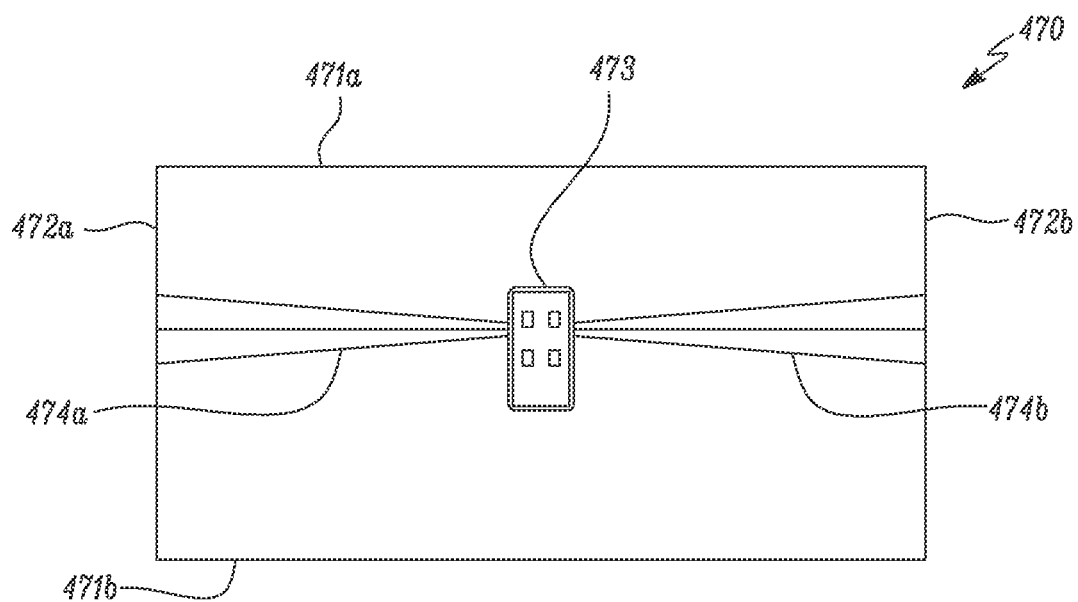
FIG. 4C shows an example one-dimensional (1-D) measurement of a perpendicular distance between two opposite walls of a building.

FIG. 4C shows an example 1-D measurement 470 of a perpendicular distance between two opposite walls of a building. In various embodiments, the 1-D measurement 470 includes a space with long sides or walls 471a and 471b of the space and short sides or walls 472a and 472b of the space, a DLMD device 473 to cast laser beams 474a and 474b onto walls 471a and 472b, respectively.

As also described above, when the shortest or perpendicular distance between two planes, such as two facing walls, like walls 472a and 472b, is needed then more than one laser beam (or a single time-sliced laser beam) pointed at different directions may be used to allow triangulation of several (for example, three) beams and calculate the perpendicular distance between the two parallel planes of interest. The multiple laser beams, their respective directions, detection of reflected beams and application of the triangulation calculations are all applied automatically by the DLMD 473 when the user activates the lasers. The DLMD 473 returns the final perpendicular distance measurement to the user.

Figure 4D:
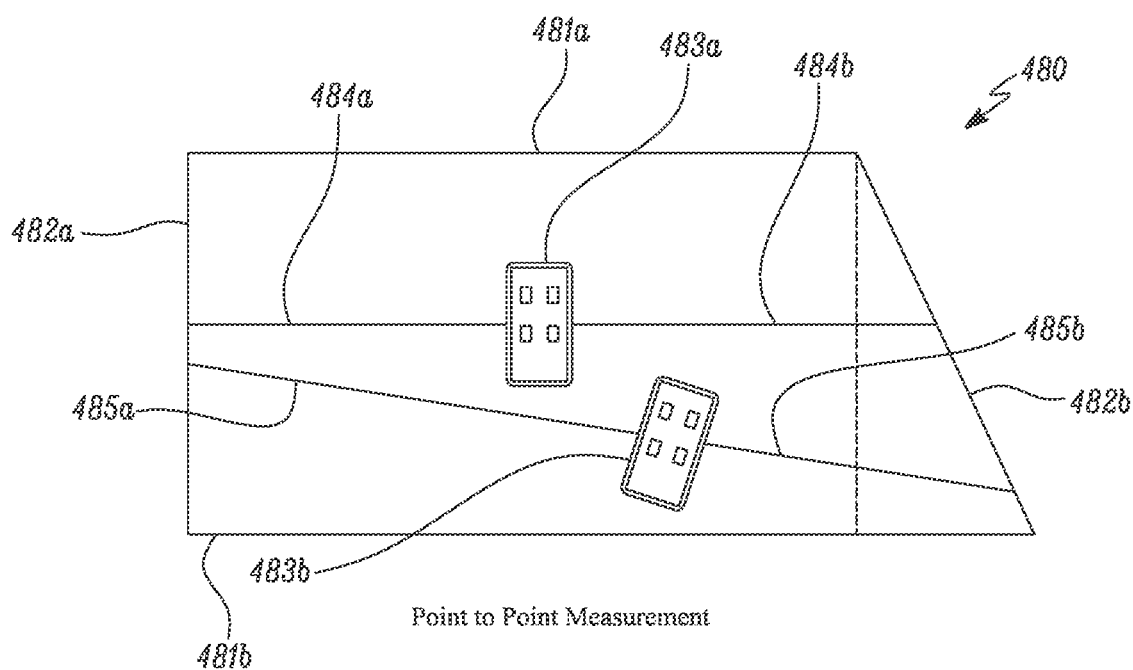
FIG. 4D shows an example 1-D measurement of a point-to-point (P-P) distance between two opposite walls of a building.

FIG. 4D shows an example 1-D measurement 480 of a point-to-point (P-P) distance between two opposite walls of a building. In some embodiments, the 1-D measurement 480 includes a space with long sides or walls 481a and 481b of the space and short sides or walls 482a and 482b of the space, a DLMD 483a to cast laser beams 484a and 484b onto arbitrary points on walls 482a and 482b, respectively. A DLMD 483b, which can be the same as DLMD device 483a, may cast laser beams 485a and 485b onto other arbitrary points onto the walls 482a and 482b, as shown.

In various embodiments, the distance between arbitrary points on planes or surfaces that may or may not be parallel, such as non-parallel walls 482a and 482b, may be measured without using triangulation. In these embodiments, a single laser beam may be sufficient to measure the point-to-point distance between two arbitrary points. For example, DLMD 483a or 483b (same DLMD used at different times) can measure arbitrary point-to-point distances as the user selects. Such applications of the DLMD may be useful when measuring a distance that is needed to be between the selected points and not the perpendicular distance between the planes on which the points are located.

Figure 4E:
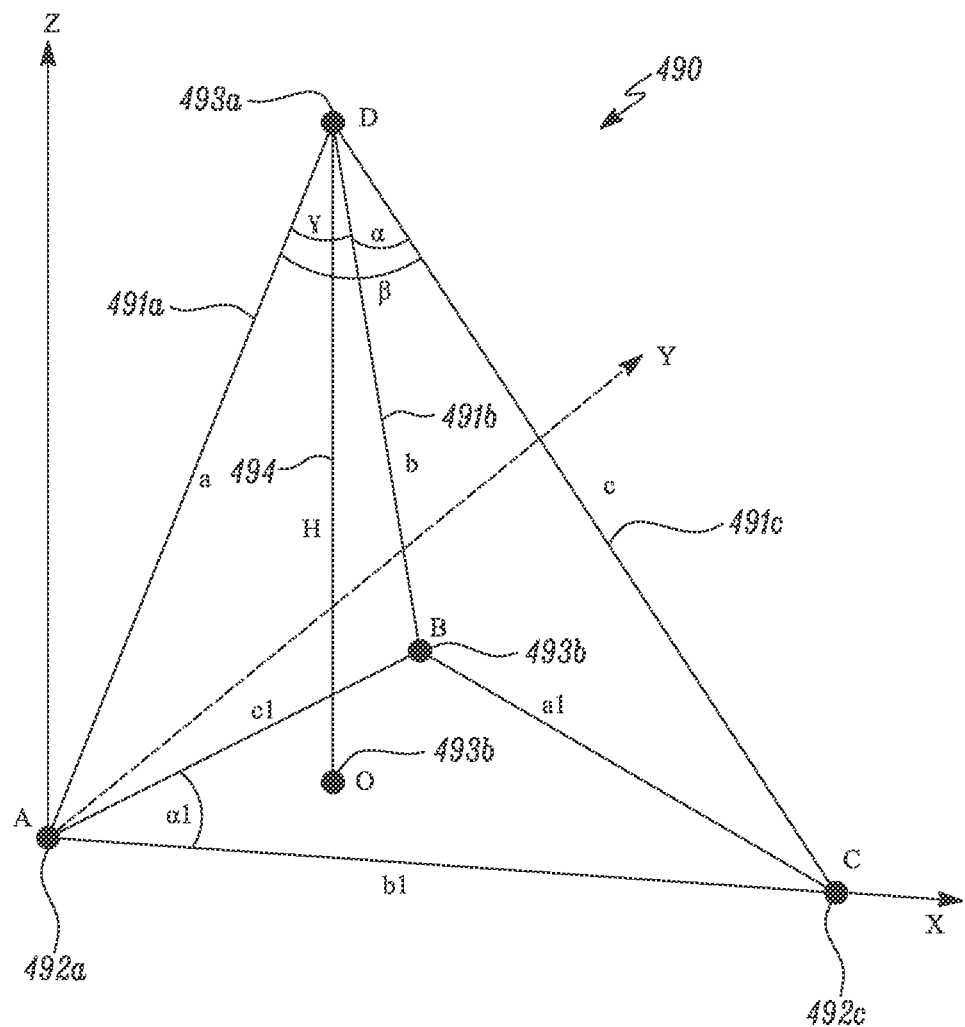
FIG. 4E shows an example triangulation pyramid to calculate the perpendicular distance between two opposite walls of a building.

FIG. 4E shows an example triangulation pyramid 490 to calculate the perpendicular distance between two opposite walls of a building. The triangulation pyramid 490 is used to calculate the perpendicular distance between a source point in space and an arbitrary plane based on three separate points projected on the arbitrary plane from the source point. The triangulation pyramid 490 includes projection sides 491a, 491b, and 491c, between source point 493a plane ABC defined by projection points 492a, 492b, and 492c. Distance 494 between source point 493a and center point 493b is the perpendicular distance between the source point and the arbitrary plane.

The projection sides 491a-491c may be formed by the laser beams projected onto the plane ABC, which may be a measurement target object, such as a wall. Having the measured projection sides 491a-491c, the perpendicular distance 494 may be calculated as outlined by the equations below with reference to the alphabetical (non-numerical) reference designation as shown in the figure. In application, the DLMD may project one such laser triangulation pyramid simultaneously on each side onto each of the two opposite walls the perpendicular distance between which is to be measured.

Let's have a point D (x,y,H) in the Decatriene coordinate system. Assume we have distances from a point D a, b, c, where DA=a, DB=b, DC=c and angles ∡ADB=γ, ∡ADC=β, ∡BDC=α. The triangle ΔABC is on the plane xy and assume that start point of the Decatriene coordinate system placed in the point A(0,0,0) and the x axis is directed along the AC line. In this case we can find, that $C(0,0,b_1)$, $B(x_1,y_1,0)$ and $O(x,y,0)$. We need to calculate the height H of the pyramid DABC, $D0 \perp (ABC)$.

Using the formula $|PQ|^2=(Q_x-P_x)^2+(Q_y-P_y)^2+(Q_z-P_z)^2$ of distance between two points $P(P_x,P_y,P_t)$, $Q(Q_x,Q_y,Q_z)$ in a space and law of cosines, we obtain system of equations to find the height H of the pyramid DABC.

$$\begin{cases} x^2 + y^2 + H^2 = a^2 \\ (x-x_1)^2 + (y-y_1)^2 + H^2 = b^2 \\ (x-b_1)^2 + y^2 + H^2 = c^2 \\ a_1 = \sqrt{b^2 + c^2 - 2bc\cos(\alpha)} \\ b_1 = \sqrt{a^2 + c^2 - 2ac\cos(\beta)} \\ c_1 = \sqrt{a^2 + b^2 - 2ab\cos(\gamma)} \\ c_1^2 = a^2 + b^2 - 2ab\cos(\gamma) \\ \alpha_1 = \arccos((b_1^2 + c_1^2 - a_1^2)/(2b_1 c_1)) \\ x_1 = c_1 \cos(\alpha_1) \\ y_1 = c_1 \sin(\alpha_1) \end{cases}$$

Simplifying first three equations, we can find $$\begin{cases} a^2 - 2xx_1 - 2yy_1 + c_1^2 = b^2 \\ a^2 - 2xb_1 + b_1^2 = c^2 \end{cases}$$

From where we can find:

$$x = \frac{a^2 - c^2 + b_1^2}{2b_1}$$

-continued $$y = \frac{b_1(a^2 - b^2 + c_1^2) - x_1(a^2 - c^2 + b_1^2)}{2b_1 y_1} =$$

$$\frac{b_1(a^2 - b^2 + c_1^2) - c_1\cos(\alpha_1)(a^2 - c^2 + b_1^2)}{2b_1 c_1 \sin(\alpha_1)}$$

$$H = \sqrt{a^2 - x^2 - y^2}$$

Figure 5:
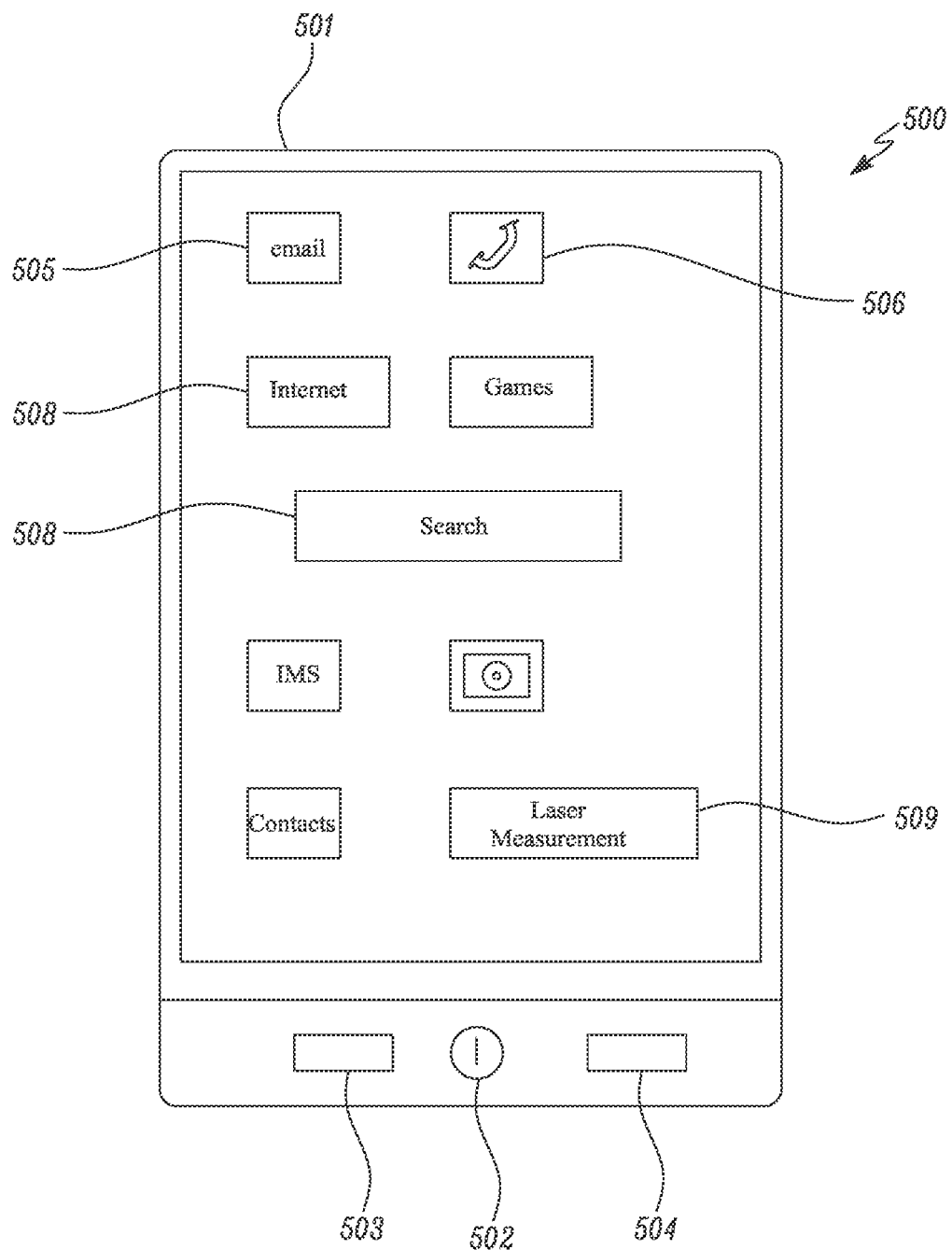
FIG. 5 shows an example smartphone with a DLMD software application (app) installed thereon.

FIG. 5 shows an example smartphone 500 with a DLMD software application (app) installed thereon. In various embodiments, the smartphone 500 may include a body 501 to which DLMD may be physically (mechanically and electrically) coupled, hardware buttons 502, 503 and 504, various icons and apps such as email app 505, phone app 506, internet app 507, search field 508, and DLMD app 509.

In various embodiments, smartphone 500 may have some or all of the components of the computing device shown in FIG. 2. In other embodiments, instead of a smartphone, a dedicated computing device, such as a mobile hand-held computing device, may be used to perform the calculations needed for data obtained using the DLMD and/or run the DLMD app 509 and other software needed for project construction. A mobile hand-held device generally fits in one human hand and can be operated with one or both hands and weighs a few hundred grams (typically less than one kilogram), which can be easily carried without undue burden. However, because of availability, popularity, and power of modern smartphones, the smartphone 500 is a readily available and suitable device for this purpose. The smartphone may be a device running Google's™ Android™ operating system or Apple's™ iPhone™ operating system and the apps suitable to run on the respective operating systems. Other similar smartphone devices and operating systems may also be used if sufficiently computationally powerful and flexible.

In some embodiments, the DLMD may be coupled with the smartphone 500 via a data interface through which data may be transmitted between the DLMD and the smartphone. The data interface may include one or more of a near-field communication (NFC) wireless protocols, BlueTooth™, ZigBee™, BLE, Z-Wave, or other internet of things (IoT) wireless protocols. The DLMD may also be coupled with the smartphone 500 via hardwired data interfaces such as Universal Serial Bus (USB), proprietary interfaces, or a combination of both. Such hardwired data interfaces may be coupled through direct connectors or via short cables between the DLMD and the smartphone 500. In some embodiments, the data interface between the DLMD and the smartphone may include power lines also to power the DLMD circuits.

In various embodiments, the DLMD app 509 may be an app designed to run on a smartphone with a mobile operating system such as Android™ or Apple's ios™. DLMD app 509 may include various data files the app uses for its setup and operation. The data files may include an initialization file, a system file, a configuration file, a resource file, a local database, a registry file and other similar data files the DLMD app 509 may read and load into memory upon being launched by a user. Alternatively or additionally, the DLMD app may read initialization data or other information needed at the time of starting the app from remote sources over a computer network, such as a remote database, remote file, and the like. The information stored in these data files may include default values for some measurements, such as standard ceiling heights (for example, 8-foot or 10-foot ceilings), concrete slab thickness, and the like. The DLMD app may also load information that were previously written by the user to a local or remote database via the DLMD app itself.

In various embodiments, part or all of the functions performed by smartphone 500 may be partially or entirely implemented by hardware and/or software deployed within the DLMD 307. In these embodiments, the DLMD may not be coupled with a separate and distinct device such as a smartphone or other hand-held computing device, but rather be a standalone device including all or a subset of the functions and facilities described herein. The standalone version of the DLMD 307 may be appropriately designed and constructed to include the needed functions. For example, it may include a touch-sensitive display screen, some hardware buttons, a local storage device, networking hardware and software, and the like. Hence, even though the descriptions herein are presented with respect to a smartphone or a hand-held computing device, all descriptions are equally and as appropriate applicable with respect to the standalone version of the DLMD.

Figure 6A:
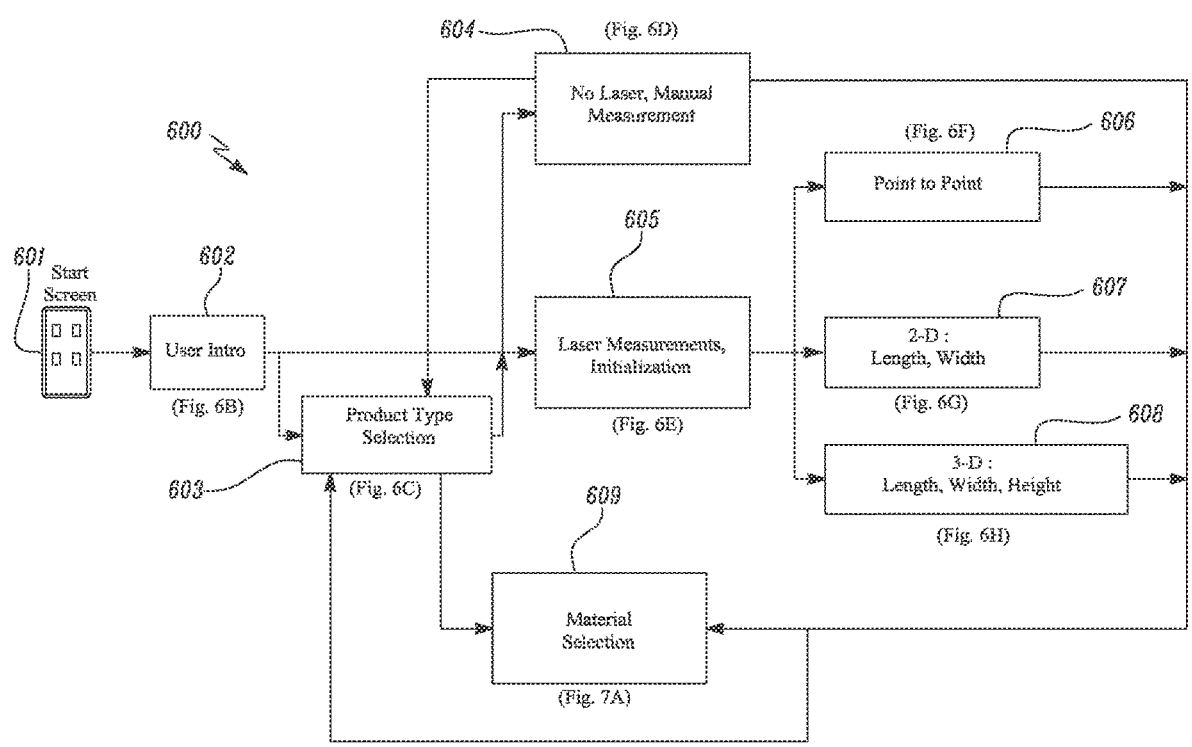
FIG. 6A shows an example overview of the DLMD app and its various screens used in the measurement process.

FIG. 6A shows an example overview 600 of the DLMD app 509 and its various screens used in the measurement process. In various embodiments the overview 600 of the DLMD app 509 (see FIG. 5) includes a start screen 601 of the smartphone, a user introduction screen 602, a product type or category selection screen 603, a manual measurement entry screen 604, a laser measurement and initialization screen 605, a 1-D point-to-point laser measurement screen 606, a 2-D laser measurement screen 607, a 3-D laser measurement screen 608, and a material selection screen 609. Most of the screens listed above may be called super-screens that include several other screens when expanded, are further described in more details in the respective figures noted next to these screens. However, in the descriptions below with respect to FIG. 6A, the super-screens are described as individual screens for simplicity and brevity.

In various embodiments, the overall material or product ordering process of the DLMD app 509 may be divided into three phases: measurement of relevant dimensions and calculate other derivate quantities such as surface areas, selection of product categories and application of dimensions to the categories, selection of specific materials and placing a direct order to purchase the selected material. These phases and steps are described in more detail below. The overview 600 shows arrows connecting different screens. In some screens multiple arrows may enter or leave the screen. Each arrow in or out of a screen is an optional or conditional path the user may take depending on user objectives or conditions that exist at the time of transition based on the options the user selected in previous screens. These conditions are noted below. In some embodiments, the selection store (see FIG. 7A) or product category may be done from more than one screen and in arbitrary order as detailed below. For example, a user may first take measurements and then identify the desired store to purchase the material from, while the user may first select the store and the perform the measurements. Similarly, the user may select product type or measurements in different orders. Generally, as long as all relevant data for a product type are identified and/or collected during this process, and there is no dependency between one step and a prior or next step, the user may collect the relevant data in any order that is convenient.

In various embodiments, the start screen 601 may include identification of the DLMD app 509, the app version, any account information such as user name, project number and the like. Those skilled in the art will appreciate that these elements may be designed in a number of ways using graphic user interface (GUI) elements, including alphanumeric entry fields, drop-down pick lists, radio buttons and the like. From this screen the user may proceed to the user introduction screen 602.

In various embodiments, the user introduction screen 602 provides introductory information about the DLMD app 509 and how it is generally used. Such introduction may include an overview of the process. The introductory information may be skipped if the user is experienced with the DLMD app 509. The user may next proceed to one of the product type selection screen 603, manual measurement screen 604, or laser measurement and initialization screen 605, depending on user preference. The user may proceed from screen 602 to product type selection screen 603 if the user wants to first select a product type and then perform the measurements for the product category selected. The user will eventually transition from screen 603 through the intermediate measurement screens to the material selection screen 609, the last screen in the process, after the measurements have been obtained. Alternatively, the user may transition directly from screen 602 to measurement screens 604 or 605, and eventually transition to screen 603 and then to screen 609.

In various embodiments, at product type selection screen 603, the user may be provided with a list or menu of various product categories available for construction-related projects, such as plumbing products, lumber products, paint products, carpets, and the like. Once the user selects a desired product, such as paint, the user may proceed to one of manual measurement screen 604 or laser measurement screen 605. If the screen 603 was entered after obtaining laser measurements (from measurement screens 604, or 606-608), the transition will be to material selection screen 609. The DLMD app 509 may keep track of the user selections, such as product category selection, in memory and/or in a database.

In various embodiments, manual measurement entry screen 604 may be used by the user when the laser devices in DLMD 307 (see FIG. 3) are not connected to the smartphone, are not ready, or for some reason cannot be used. Also, if the user already has the needed measurements (for example, from a blueprint map of the building being measured), the user may choose to enter the known measurements manually instead of re-measuring them with the DLMD 307. In this screen, the user may be presented with a user interface (UI), including a numerical keypad, to enter the known measurements for storage in the DLMD app 509's database for further processing. The user may transition from this screen to either material selection screen 609 or to product type selection screen 603 (if product type was not selected before entering screen 604) and then to screen 609.

In various embodiments, the laser measurement screen 605 presents a UI to the user to select the type of measurement the user wants to use. The types of measurement may include a straight distance (1-D), a surface measurement (2-D), a room dimension measurement (3-D), or other measurements, further described with respect to FIG. 6E below. Depending on the measurement type, the user may proceed to either one of the screens 606, 607, or 608.

In various embodiments, the point-to-point (1-D) measurement screen 606 allows the user to measure a straight distance, or a line, between two selected points located on some surfaces of the building or space being measured. The line being measured may be a perpendicular distance between two parallel surfaces, such as two opposite walls in a room, or an arbitrary non-perpendicular distance between the two points. Once the measurement is obtained using the DLMD 307, the user may transition from this screen to either material selection screen 609 or to product type selection screen 603 (if product type was not selected before entering screen 604) and then to screen 609.

In various embodiments, the surface (2-D) measurement screen 607 allows the user to measure two edges or sides of a surface, such as a floor or wall. The distances measured may be used to calculate the 2-D surfaces. Once the measurement is obtained using the DLMD 307, the user may transition from this screen to either material selection screen 609 or to product type selection screen 603 (if product type was not selected before entering screen 604) and then to screen 609.

In various embodiments, the room dimensions (3-D) measurement screen 608 allows the user to measure three edges or sides of a room or space in the building being measured. Once the measurement is obtained using the DLMD 307, the user may transition from this screen to either material selection screen 609 or to product type selection screen 603 (if product type was not selected before entering screen 604) and then to screen 609.

In various embodiments, the material selection screen 609 is used to select specific material, such as a particular amount of paint in a particular color, based on the measurements previously obtained. This is the last screen in the process and purchase order for the materials selected may be placed from this screen.

Figure 6B:
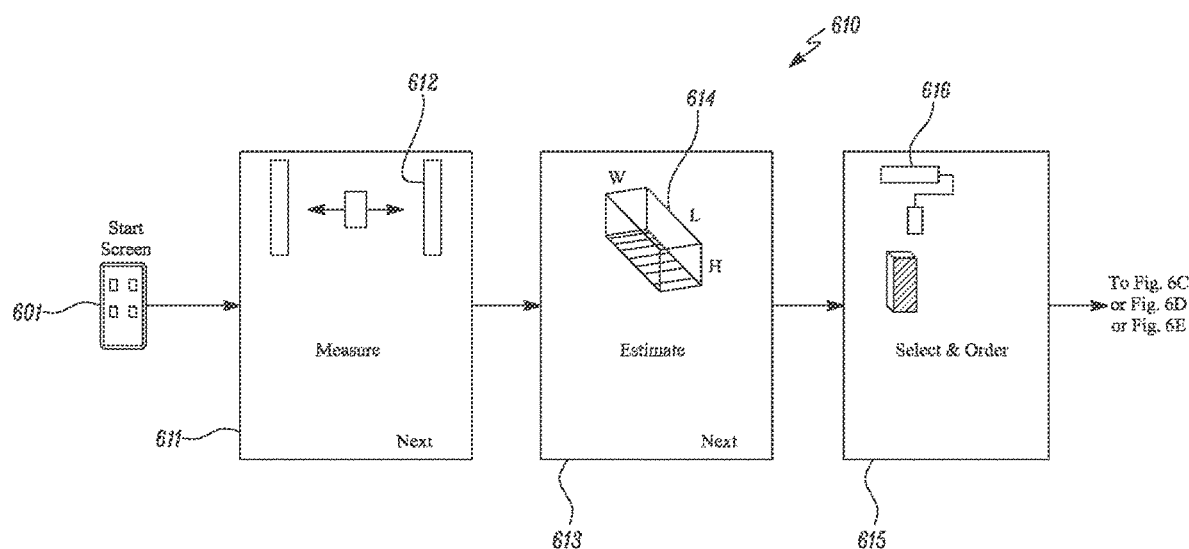
FIG. 6B shows example DLMD app start screen and user introduction screens.

FIG. 6B shows example DLMD app start screen and user introduction screens 610.

In various embodiments, this configuration includes the start screen 601 and user introduction screen 602 (see FIG. 6A) that is expanded into several more introduction screens 611, 613 and 615. First introduction screen 611 includes icons 612 to signify the measurement phase of the material ordering process. The second introduction screen 613 includes icons 614 to signify the material type selection and other estimated dimensions phase of the material ordering process. And the third introduction screen 615 includes icons 616 signifying specific material selections and purchasing phase of the material ordering process.

In various embodiments, each of the three introduction screens 611, 613 and 615 may include figures and descriptions to briefly describe and explain the three phases of the material ordering process to a new user using the DLMD app 509.

Figure 6C:
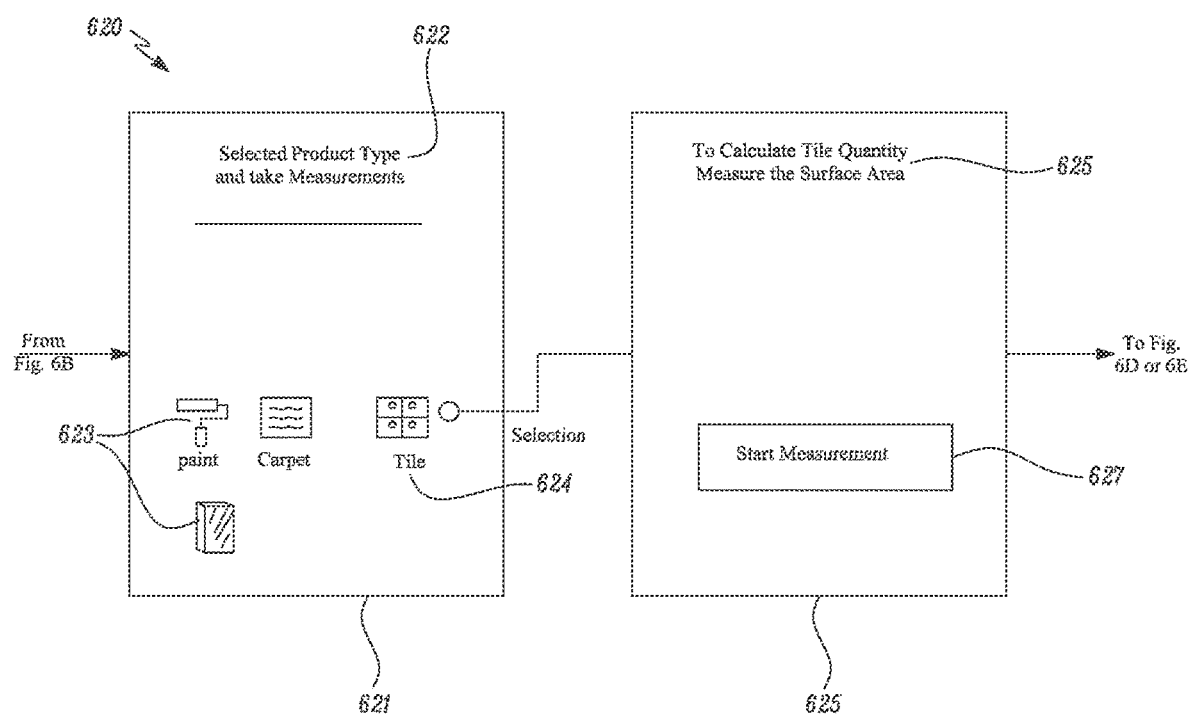
FIG. 6C shows example DLMD app product category selection screens.

FIG. 6C shows example DLMD app product category selection screens 620. In various embodiments, product category selection screens 620 include product type screen 621 and guidance screen 625, which are expansions of screen 603 of FIG. 6A. Product type screen 621 may include instructions and/or titles 622 product categories 623 of which a selected category 624 determines the contents of the guidance screen 625 for transition. Guidance screen 625 may include tile and/or instructions 626 and a measurement start button 627 to transition to measurement screens.

In various embodiments, the product categories relevant to construction projects appear on the product type screen for user selection. The product types or categories may include tile, hardwood, carpet, paint, lumber, plumbing, molding, drywall, electrical wiring, paint primers, stone, window coverings, door and window frames, vinyl flooring, and the like.

In various embodiments, the product types may be presented as buttons or hotlinks that the user may click on to select. The product types may be presented in alternate ways, such as by drop-down lists, picklists, checkboxes, radio buttons, and the like. Once the user has selected a product category, the screen transitions to guidance screen 625. The guidance screen 625 may present instructions or information about the needed measurements for the selected product type. For example, if the user selects paint, then the guidance screen 625 may advise the user that for buying paint the user has to measure the surface area of the walls. As another example, if the user selects plumbing, the guidance screen 625 may advise the user that a linear distance is needed to know how many feet of pipe the user has to purchase.

In various embodiments, the product category selected by the user may be saved by user action, such as pressing save button (not shown in this figure) or it may be saved automatically by the DLMD app 509 to be retrieved later for other screens later in the process, such as the screens in FIG. 7A described below.

In various embodiments, the user may click on the button 627 to move on to measurement screens.

It will be appreciated that one or more of the GUI elements, such as buttons, hotlinks, pointers, dropdown lists, and the like may be implemented as a software elements, hardware elements, or a combination of hardware and software elements. For example, a laser activation button (for example, see laser activation button 651d in FIG. 6F) may be implemented as a hardware button on the DLMD, a hardware button assigned to this function on the smartphone to which the DLMD is coupled, any such hardware buttons coupled with a GUI button on the DLMD app 509, and any other such combinations of hardware and/or software buttons and elements that perform the intended function. In general, those skilled in the art will appreciate that the DLMD app 509 has a software routine corresponding to and coupled with each of the GUI elements or hardware buttons to carry out the intended and indicated function of the GUI elements. For example, a "Save" GUI or hardware button that is intended to save certain data may have a corresponding software routine within the DLMD app 509 that executes data transfer instructions to save the data on a storage device.

Figure 6D:
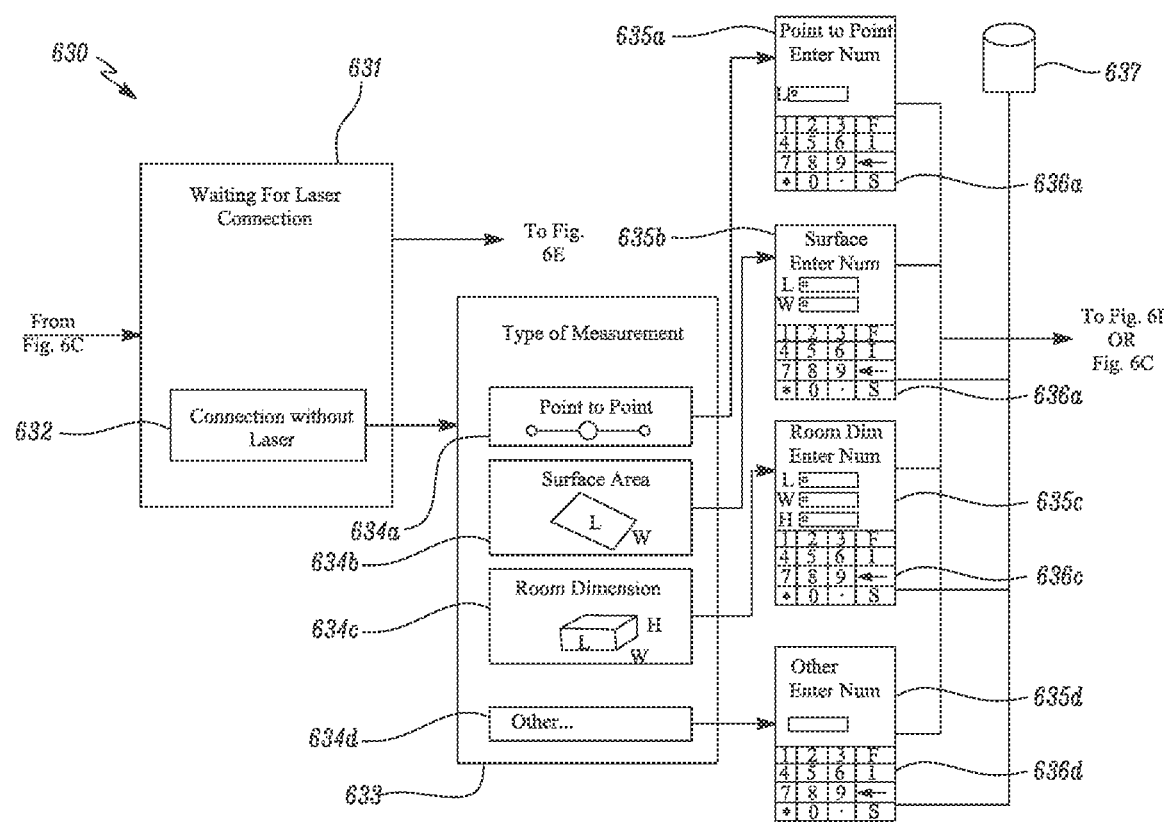
FIG. 6D shows example DLMD app manual measurement entry screens.

FIG. 6D shows example DLMD app manual measurement entry screens 630. In various embodiments, manual measurement entry screens 630 includes a dialog screen 631 with a manual measurement button 632, a type of measurement screen 633 having a 1-D measurement button 634a, a 2-D measurement button 634b, a 3-D measurement button 634c, and another measurement button 634d. Screens resulting from pressing any of the measurement types buttons include 1-D data entry screen 635a having one data entry field for entering a measurement distance and a keypad including a save button 636a to store the entered data in a data storage device 637. Other similar resulting screens include 2-D data entry screen 635b having two data entry fields and a keypad with a save button 636b, 3-D data entry screen 635c having three data entry fields a keypad with a save button 636c, and another data entry screen 635d having one or more data entry field and a keypad with a save button 636d.

In various embodiments, each of the measurement type buttons 634a-634d, selected by the user causes a transition to a corresponding data entry screen 635a-635d, in which the user may enter data manually. Each of the data entry screens 635a-635d has a number of user-selectable data entry fields that matches the number of dimensions needed for the particular type of measurement. For example, for a 1-D length measurement one data entry field is needed, while for 2-D and 3-D measurements two and three data entry fields are provided, including length and width or length, width, and height fields. Once the data is manually entered and reviewed for correctness by the user, the save button may be used to save the entered data in the data storage device 637.

In various embodiments, the data storage device 637 may include a magnetic disk drive, a non-volatile memory, or any other type of non-volatile storage system. The data storage device 637 may be located locally on the smartphone coupled with the DLMD or be a remotely accessed storage device that is accessible through a computer network similar to the one depicted in FIG. 1. In other embodiments, the storage device 637 may be implemented as a combination of local memory and cloud-based storage so that the DLMD can be used both online and offline when no computer network, such as the internet, is available.

In some embodiments, the data storage device 637 may be used to recall or retrieve previously saved data for review or reuse during manual data entry or to override a laser measurements. To retrieve stored data, additional user interface may be used, not shown in the figures disclosed here for simplicity, based on construction project identifiers and data record identifiers to access the appropriate records in the storage. Some UI for data interface to search for and/or retrieve information from a database or data storage are known in various applications.

In various embodiments, the other measurement button 634d and other data entry screen 635d are used for measurement of other types of dimensions such as concrete slabs that may have special dimensions such as length, width and a fixed slab thickness. There may be other measurement types that fall into this category with various measurements and dimensions needed.

Figure 6E:
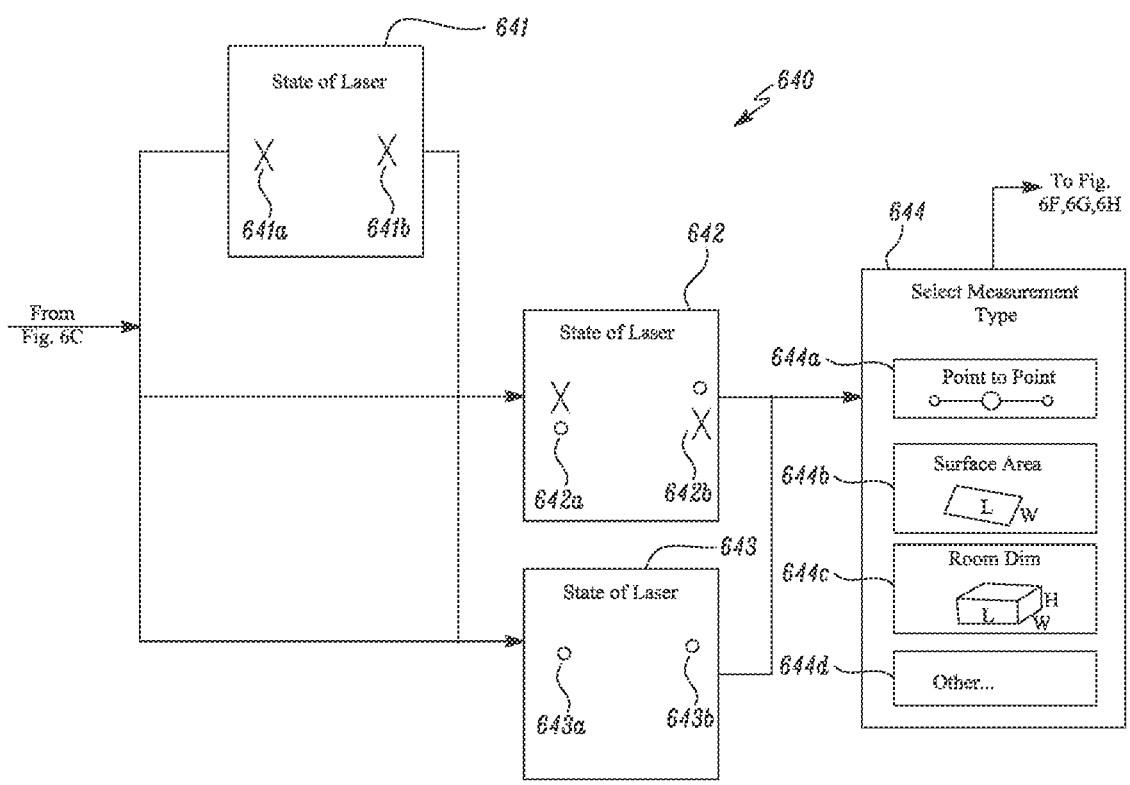
FIG. 6E shows example DLMD app DLMD state screens and measurement type selection screens.

FIG. 6E shows example DLMD app DLMD state screens and measurement type selection screens 640. In various embodiments, the DLMD state screens 640 include first laser state screen 641 showing laser doors or gates 641a and 641b in closed state as signified by the cross marks (X). Second laser state screen 642 shows laser shutters or gates 642a and 642b as one being in open state (signified by a circle: O) and the other one being in a closed state. The third laser state screen 643 shows laser gates 643a and 643b as both being in open state. Measurement type selection screen 644 has several GUI elements for selection of measurement type and subsequent measurement screens, including a 1-D (linear distance) measurement type 644a, 2-D (surface) measurement type 644b, 3-D (room dimensions) measurement type 644c, and other measurement types 644d.

In various embodiments, the laser emitters 451-453 on the photodetection units 402-404 (see FIG. 4B) of DLMD 307, may have electronic or mechanical devices that act as shutters or gates that can enable or disable the laser emitters to cast beams. To enable or disable a laser, the shutters may be used to physically obstruct the beam or disable the laser device electronically from generating a laser beam. The user may select one of the laser states 641, 642, or 643 depending on the type of measurement desired or needed. Specifically, if both laser gates 641a and 641b are closed then no laser measurement is possible and the user may use the manual data entry screens 635a-635d to enter measurement data. In the case that only one laser gate is open, the user may want to use the DLMD as a one-sided laser measurement device, for example to measure from one end of a line to the other end. In the case of both laser gates being open, the user uses the DLMD as a double-sided measurement device as described herein. In various embodiments, the laser states 641-643 may be selected by using various common GUI-based elements, such as radio buttons, dropdown lists, checkboxes, and the like (not shown). For example, the user may select to have laser state 642 where the laser light sources on one side of the DLMD 307 is active or open, while the other side remains inactive or closed. In some embodiments, a single laser light source may be selected by the user on each side of the DLMD 307 for use from multiple laser light sources deployed within each side of the DLMD 307.

In various embodiments, the user selects a measurement type from the measurement type screen 644 to measure dimensions in a building or space with the DLMD photo-detection units 402-404. Specifically, the user may select one of the 644a-644d measurement type buttons and transition to one of the measurement screens 606, 607, or 608, as further described below.

Figure 6F:
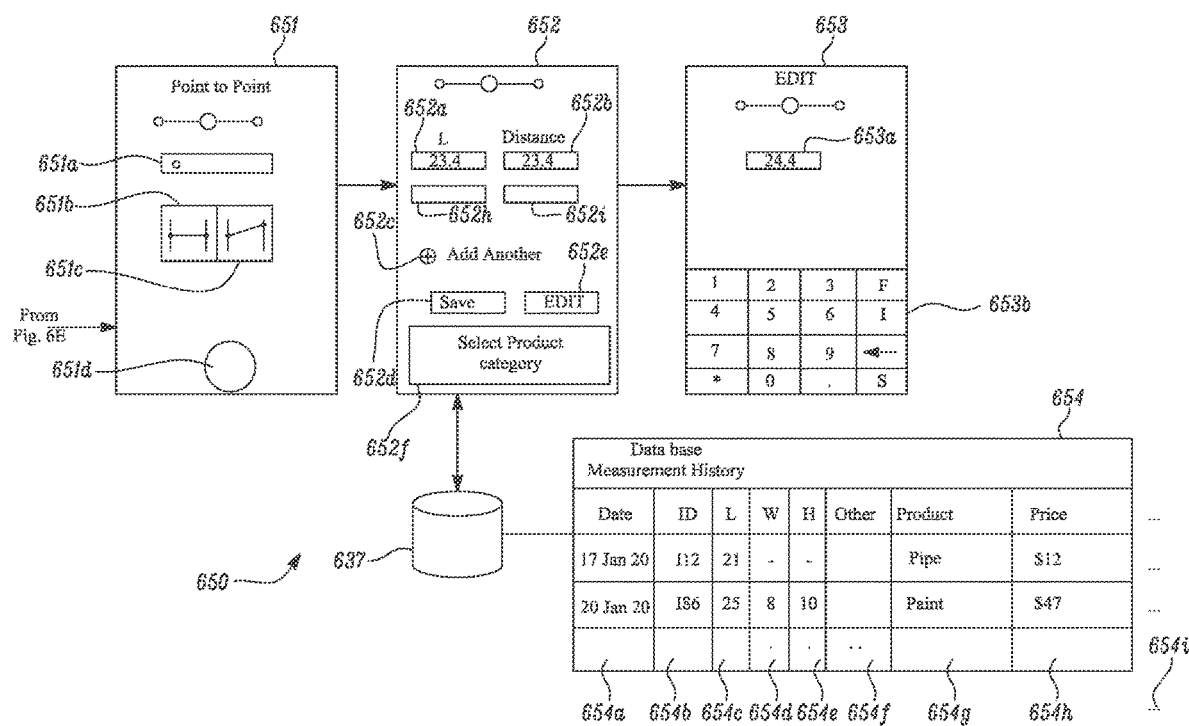
FIG. 6F shows example DLMD app 1-D distance measurement screens and database.

FIG. 6F shows example DLMD app 1-D distance measurement screens 650 and database. In various embodiments, a laser activation screens 651 that includes a data field 651a, measurement mode buttons 651b and 651c, and laser activation button 651d. Data presentation screen 652 includes a length data field 652a, a calculated or derived dimension field 652b, an add button 652c added length data field 652h and derived field 652i, a save button 652d, an edit button 652e, and a select product category 652f. An Edit screen 653 includes a data entry edit field 653a, a keypad 653b. The data storage 637 is used to store and save measured length data in a database 654 having various fields including data 654a, project ID 654b, length data 654c, width data 654d, height data 654e, other data 654f (may have more than one sub-field), product identifier 654g, and product price 654h. Multiple other fields 654i may be incorporated into the database 654 to store other related data such as user entering data, project address, cost limits for each product, and the like.

In various embodiments, the laser activation screen 651 is the first screen the user encounters in this type of the measurement. Measurement mode buttons 651b and 651c are used to specify which one of the two modes of measurement the user wants to use. The two modes include a perpendicular measurement mode and a point-to-point mode. A perpendicular mode, as described above with respect to FIGS. 4C-4E, is the shortest (perpendicular) distance between two parallel planes, while a point-to-point mode measures the distance between two arbitrary points, which may be on two parallel planes, such as two opposite walls in a rectangular room, or on any other surface.

In various embodiments, the perpendicular mode button 651b may be selected by the user to apply the perpendicular mode of measurement. In this mode, the DLMD uses triangulation to get the perpendicular distance between two parallel planes. Selecting the P-P mode button 651c disables the triangulation mode and one of the laser emitters from the multiple laser emitters available on each side of the DLMD will be used.

In various embodiments, the laser activation button 651d is activated by the user by clicking on it to start the actual laser measurement. The user will hold the DLMD device at a place between the points to be measured, as depicted in FIGS. 3, 4C and 4D, and click on the laser activation button 651d to measure and record the distance. This procedure is repeated by the user for each dimension to be measured and for additional dimensions added for additional measurements, such as performing the same measurement for another nearby space, using the add another button 652c.

In various embodiments, once the laser activation button 651d is pressed and the measurement is taken, the data presentation screen 652 appears on the smartphone to show the value of the measurement in data field 652a. The derived dimension 652b is also calculated and displayed. In the case of a 1-D measurement, the derived dimension is the same as the measured value, but for multiple dimensions, the derived dimensions are generally different, as further described below.

In various embodiments, the save button 652d is used by the user to store and save the measurement obtained in the database measurement history 654. In some embodiments, all or some measurements may be saved automatically based on configuration settings in the DLMD app 509 (see FIG. 5). In some embodiments, such configuration settings may be built-in for some app versions, while in other embodiments, the configuration settings may be changed by the user.

In various embodiments, the edit button 652e may be used by the user to edit the measurements taken by the DLMD. This feature may be useful when the user knows something about the space being measured, or for other reasons, that is not reflected in the laser measurement. For example, if the space being measured is not rectangular and has some corners that are not included in the measurement of the space, the user can enter slightly larger numbers to purchase more materials to cover the corners not measured.

In various embodiments, once the edit button 652e is clicked, edit screen 653 is presented to provide a UI for the user to edit the measurements. Initially the data field 653a with the measured value is displayed. The user can use keypad 653b to edit the number displayed in data field 653a.

In various embodiments, the database measurement history 654 may be a simple table of parameters and values, a relational database, multiple database tables, or other types of organized data storage suitable for saving, searching for, and retrieving data items. UI for the database search and data retrieval may be one of any of the common interfaces available, not shown in the figures to preserve clarity and brevity.

In various embodiments, the select product category selection button 662h may be used by the user if the path taken, with reference to FIG. 6A, did not go through super-screen (or screen set) 603 to select product category before attempting measurements. If the user has already selected product category, then the product category selection button 662h may be set to an inactive status ("grayed out", as is conventionally known) by the MLMD app, or it may simply not be used by the user.

Figure 6G:
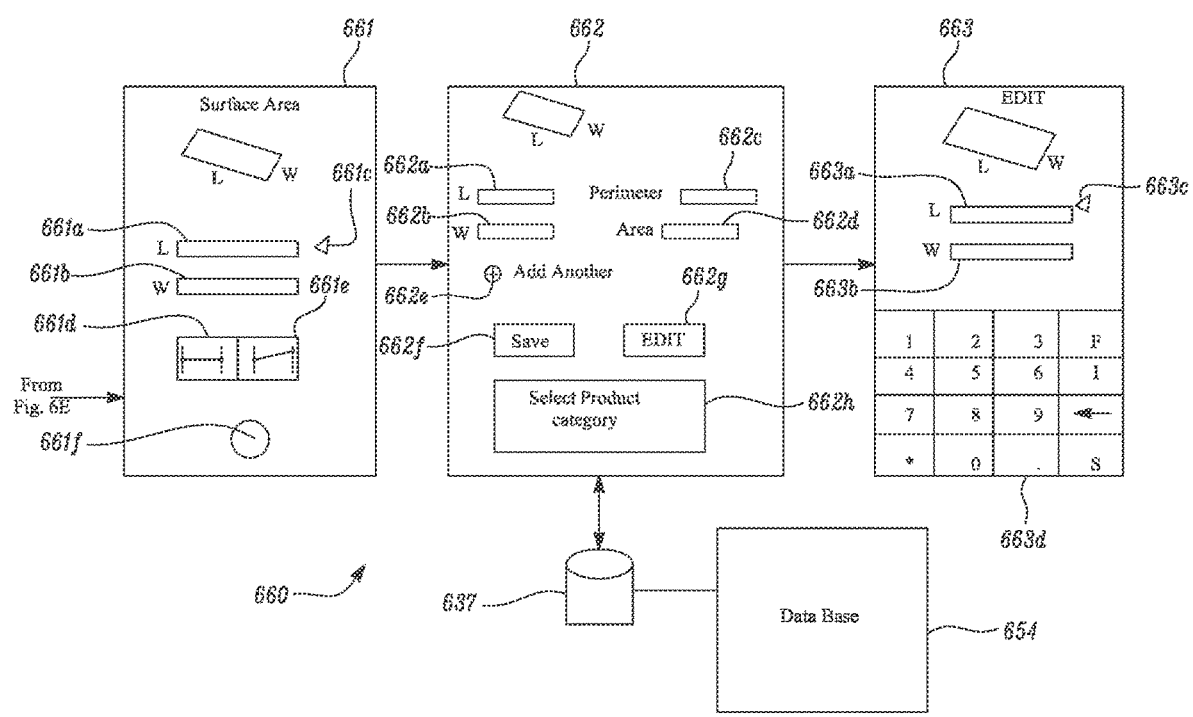
FIG. 6G shows example DLMD app surface area (2-D) measurement screens.

FIG. 6G shows example DLMD app surface area (2-D) measurement screens 660. In various embodiments, a laser activation screens 661 that includes a length data field 661a and a width data field 661b, field selection indicator 661c, measurement mode buttons 661d and 661e, and laser activation button 661f. Data presentation screen 662 includes a length data field 662a, a width data field 662b, a perimeter calculated or derived field 662c, a surface area calculated field 662d, an add button 662e to add more length and width data fields, a save button 662f, an edit button 662g, and a select product category 662h. An Edit screen 663 includes a length data entry edit field 663a, a width data entry edit field 663b, a data field selection indicator 663c, and a keypad 663d. The data storage 637 is used to store and save measured length data in the database 654 having various fields, as described above with respect to FIG. 6F (not repeated in this figure).

In various embodiments, the laser activation screen 661 is the first screen the user encounters in this type of the measurement. Measurement mode buttons 661d and 661e are used to specify which one of the two modes of measurement the user wants to use. The two modes include a perpendicular measurement mode and a point-to-point mode, as described above with respect to FIG. 6F. Even though in a 2-D type of measurement, more than one measurement is taken, but each measurement is a linear distance measurement (length or width) and the measurement mode is applicable. Therefore, the mode options are provided for most or all types of measurements.

In various embodiments, the field selection indicator 661c indicates which of the two data fields 661a and 661b is selected as the next dimension to be measured. A data field may be selected by various methods in a GUI environment, such as clicking on the field or using selection arrows (not shown). Once the data field is selected for measurement, the laser activation button 661f is activated by the user by clicking on it to start the actual laser measurement. The user will hold the DLMD device at a place between the points to be measured, as depicted in FIGS. 3, 4C and 4D, and click on the laser activation button 661f to measure and record the distance. This procedure is repeated by the user for each dimension to be measured and for additional dimensions added for additional measurements, such as performing the same measurement for another nearby space, using the add another button 662e.

In various embodiments, once the laser activation button 661f is pressed and the measurement is taken, the data presentation screen 662 appears on the smartphone to show the value of the measurement in data fields 662a and 662b. The derived dimensions 662c and 662d are also calculated and displayed. In the case of a 2-D measurement, the derived dimensions may include perimeter of the space being measured and the surface area, such as floor area, which are calculated based on the measured numbers in data fields 662a and 662b.

In various embodiments, the save button 662f is used by the user to store and save the measurement obtained and the derived dimensions values in the database measurement history 654. In some embodiments, all or some measurements may be saved automatically based on configuration settings in the DLMD app 509 (see FIG. 5). In some embodiments, such configuration settings may be built-in for some app versions, while in other embodiments, the configuration settings may be changed by the user.

In various embodiments, the edit button 662g may be used by the user to edit the measurements taken by the DLMD. This feature may be useful when the user knows something about the space being measured, or for other reasons, that is not reflected in the laser measurement. For example, if the space being measured is not rectangular and has some corners that are not included in the measurement of the space, the user can enter slightly larger numbers to purchase more materials to cover the corners not measured.

In various embodiments, once the edit button 662g is clicked, edit screen 663 is presented to provide a UI for the user to edit the measurements. Initially the data fields 663a and 663b with the measured values are displayed. The user can use keypad 663d to edit the number displayed in data fields 663a and 663b. The user may select one of the data entry fields 663a and 663b by various GUI methods, such as clicking on the data fields or moving the data selection indicator 663c to the desired data field.

In various embodiments, the database measurement history 654 is as described above with respect to FIG. 6F.

In various embodiments, the select product category selection button 662h may be used by the user if the path taken, with reference to FIG. 6A, did not go through super-screen (or screen set) 603 to select product category before attempting measurements. If the user has already selected product category, then the product category selection button 662h may be set to an inactive status ("grayed out", as is conventionally known) by the MLMD app, or it may simply not be used by the user.

Figure 6H:
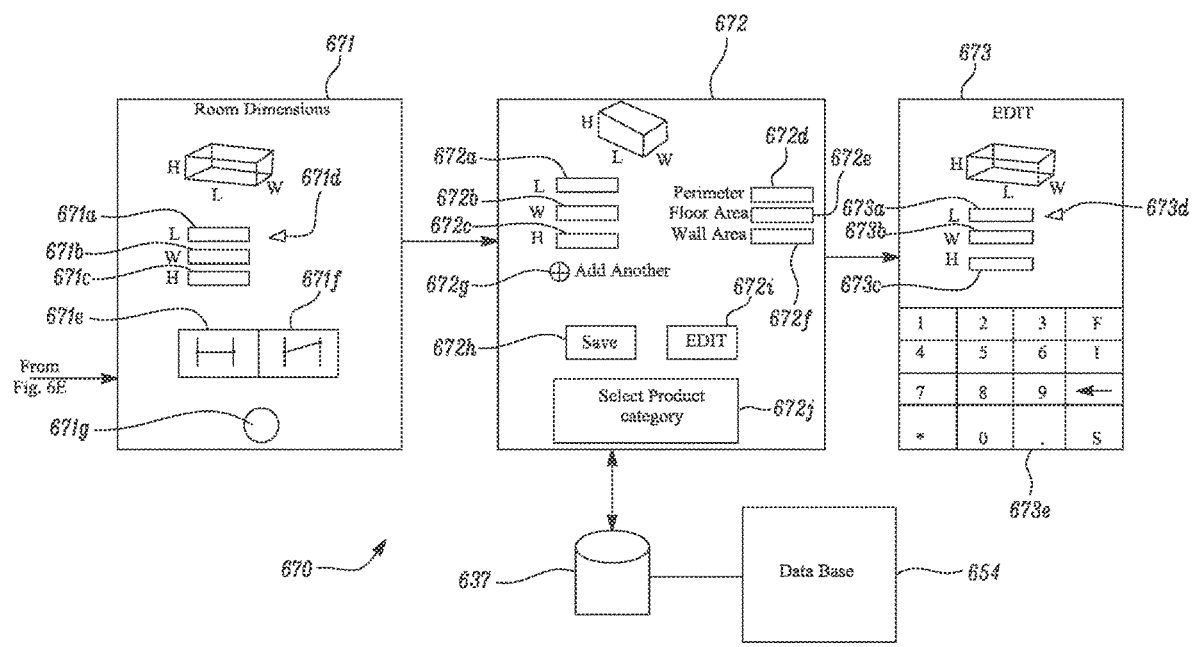
FIG. 6H shows example DLMD app room dimensions (3-D) measurement screens.

FIG. 6H shows example DLMD app room dimensions (3-D) measurement screens 670. In various embodiments, a laser activation screens 671 that includes a length data field 671a, a width data field 671b, and a height data field 671c, data field indicator 671d, measurement mode buttons 671e and 671f, and laser activation button 671g. Data presentation screen 672 includes a length data field 672a, a width data field 672b, a height data field 672c, a perimeter calculated or derived field 672d, a floor area 672e, a surface area calculated field 662f, an add button 672g to add more length, width, and height data fields, a save button 672h, an edit button 672i, and a select product category 672j. An Edit screen 673 includes a length data entry edit field 673a, a width data entry edit field 673b, a height data entry field 673c, a data field selection indicator 663d, and a keypad 673e. The data storage 637 is used to store and save measured length data in the database 654 having various fields, as described above with respect to FIG. 6F (not repeated in this figure).

In various embodiments, the laser activation screen 671 is the first screen the user encounters in this type of the measurement. Measurement mode buttons 671e and 671f are used to specify which one of the two modes of measurement the user wants to use. The two modes include a perpendicular measurement mode and a point-to-point mode, as described above with respect to FIG. 6F. Even though in a 3-D type of measurement, more than one measurement is taken, but each measurement is a linear distance measurement (length, width, or height) and the measurement mode is applicable. Therefore, the mode options are provided for most or all types of measurements.

In various embodiments, the field selection indicator 671d indicates which of the three data fields 671a-671c is selected as the next dimension to be measured. A data field may be selected by various methods in a GUI environment, such as clicking on the field or using selection arrows (not shown). Once the data field is selected for measurement, the laser activation button 671g is activated by the user by clicking on it to start the actual laser measurement. The user will hold the DLMD device at a place between the points to be measured, as depicted in FIGS. 3, 4C and 4D, and click on the laser activation button 671g to measure and record the distance. This procedure is repeated by the user for each dimension to be measured and for additional dimensions added for additional measurements, such as performing the same measurement for another nearby space, using the add another button 672g.

In various embodiments, once the laser activation button 671g is pressed and the measurement is taken, the data presentation screen 672 appears on the smartphone to show the value of the measurement in data fields 672a, 672b, and 672c. The derived dimensions 672d, 672e, and 672f are also calculated and displayed. In the case of a 3-D measurement, the derived dimensions may include perimeter of the space being measured, the surface area, such as floor area or wall area, and the wall area 672, which are calculated based on the measured numbers in data fields 672a, 672b, and 672c.

In various embodiments, the save button 672h is used by the user to store and save the measurement obtained and the derived dimensions values in the database measurement history 654. In some embodiments, all or some measurements may be saved automatically based on configuration settings in the DLMD app 509 (see FIG. 5). In some embodiments, such configuration settings may be built-in for some app versions, while in other embodiments, the configuration settings may be changed by the user.

In various embodiments, the edit button 672*i* may be used by the user to edit the measurements taken by the DLMD. This feature may be useful when the user knows something about the space being measured, or for other reasons, that is not reflected in the laser measurement. For example, if the space being measured is not rectangular and has some corners that are not included in the measurement of the space, the user can enter slightly larger numbers to purchase more materials to cover the corners not measured.

In various embodiments, once the edit button 672*i* is clicked, edit screen 673 is presented to provide a UI for the user to edit the measurements. Initially the data fields 673*a*, 673*b*, and 673*c*, with the measured values are displayed. The user can use keypad 673*e* to edit the number displayed in data fields 673*a*, 673*b*, and 673*c*. The user may select one of the data entry fields 673*a*, 673*b*, and 673*c* by various GUI methods, such as clicking on the data fields or moving the data selection indicator 673*d* to the desired data field.

In various embodiments, the database measurement history 654 is as described above with respect to FIG. 6F.

In various embodiments, the select product category selection button 672*j* may be used by the user if the path taken, with reference to FIG. 6A, did not go through super-screen (or screen set) 603 to select product category before attempting measurements. If the user has already selected product category, then the product category selection button 672*j* may be set to an inactive status ("grayed out", as is conventionally known) by the MLMD app, or it may simply not be used by the user.

Figure 7A:
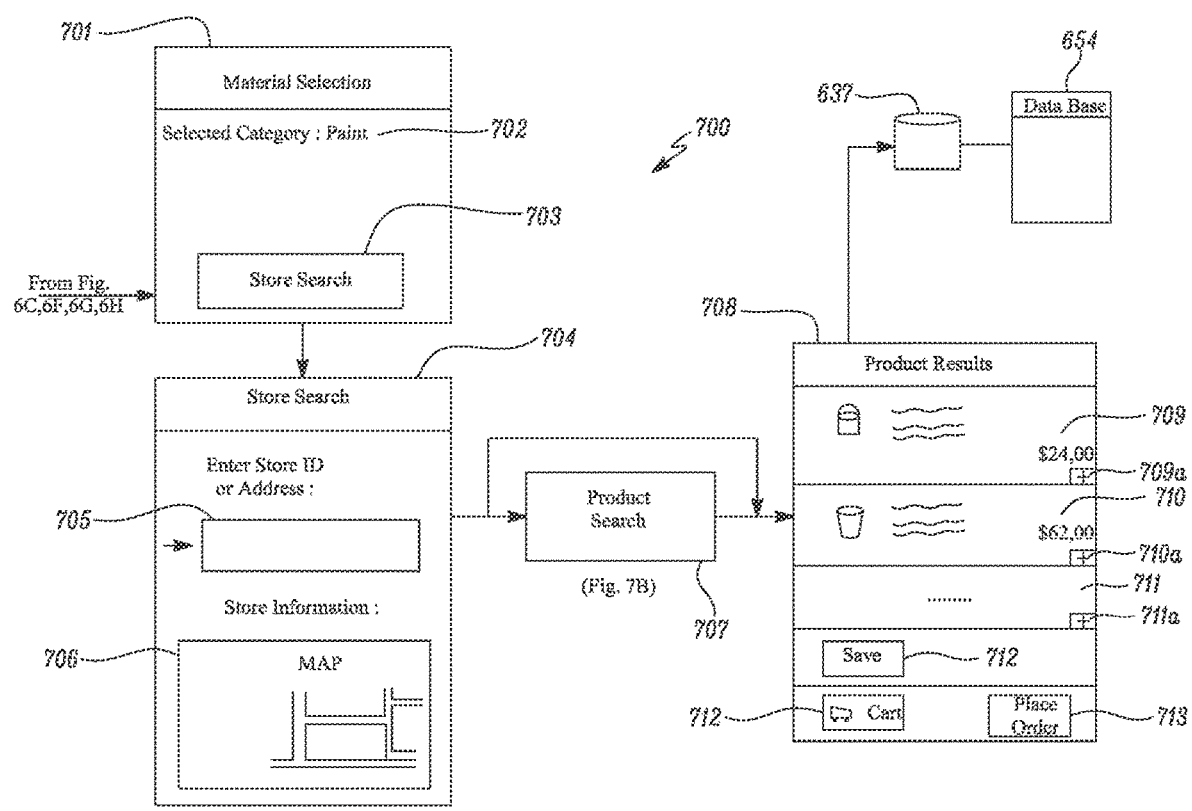
FIG. 7A shows example DLMD app material selection screens.

FIG. 7A shows example DLMD app material selection screens 700. In various embodiments, the material selection screens 700 include a material selection start screen 701 displaying the product category 702 the user has previously selected, and a store search field 703. A store search screen 704 is also included having a store search field 705 and a store information display area 706. The material selection screens 700 further include a product search screen 707 described in more detail below with respect to FIG. 7B, a product results screen 708 associated with data storage device 637 and database 654. Product results screen 708 incudes a listing of specific products 709, 710, and 711, that match all search criteria set by the user. Each product listing further includes add buttons 709*a*, 710*a*, and 711*a*, respectively, to add the selected product to a shopping cart 712. Once the shopping cart is completed, the user may use an order button 713 to place the order with a selected store, which supplies construction products.

In various embodiments, the material selection start screen 701 displays the product category 702 retrieved by DLMD app 509 from its database records earlier saved based on user selections. The product category is needed to list relevant products that fall in the selected category. For example, if the user selected "Paint" category earlier in the process, this category may be used in most or all subsequent screens to guide measurements needed and products presented for selection. In this example, to determine the amount of paint needed, the areas of surfaces to be painted, such as walls and doors, are needed. Hence, a 2-D measurement type will be advised or presented as default by the DLMD app 509 based on the product category selected. And during specific product selections, the DLMD app 509 retrieves and presents paint products for user selection, and not lumber or carpet products.

In various embodiments, the store search screen 704 provides a UI to search for local or online stores for the purpose of product purchases by the user via the DLMD app 509 integrated environment. The store search may be based on keywords, store name, locality (e.g., using postal code), store address, store name or ID, and the like. Upon completion of the search a list of stores may be presented to the user in the information display area 706. Upon user selection of a specific store, the store information, such as name, ID, location, map, and the like may be displayed in the information display area 706. The store listed in the information area may be a physical store or an online store that can be used to purchase products. The DLMD app 509 may also save and store this information in the database and/or other memory or data storage for the duration of the measurement and purchase process.

In various embodiments, product search screen 707 (described below with respect to FIG. 7B) allows the user to search for specific products in the selected product category and from selected store. The results of the product search are presented in product results screen 708.

In various embodiments, product results screen 708 lists the candidate specific products that qualified under the search criteria in the product search step in search screen 707. The user may select one or more specific products from the list presented in product results screen 708 and click on save button 712 to save the products selection in database 654 stored on storage device 637. The specific products are actual products that have an assigned stock keeping unit (SKU) number and can be purchased, as opposed to abstract product types. The user may add specific products the user intends to purchase to the shopping cart 712 by clicking on the add buttons (709*a*, 710*a*, and 711*a*) of the appropriate product. Once all specific products intended for purchase have been added to the shopping cart 712, the user may click on the order button 713 to transmit the order list including the selected specific products to the store selected on screen 704 and shown in the information area 706. The data symbolically saved in the shopping cart 712 may be actually stored in a volatile or non-volatile memory on the smartphone or in the data storage device 637.

In various embodiments, the order list including the selected specific products that may be transmitted to the selected store using electronic data interchange (EDI) systems. An EDI system is generally used for the transfer of business-related data between business partners or between a business and a supplier of goods or services to that business. These data may be in the form of files that contain purchase orders, invoices, shipping documents, payment documents, inventory information, and the like. EDI systems specify standardized formats for documents and various data types that all computer systems having an EDI system installed on them can understand and process. For example, an EDI system may specify various date formats, such as "month/day/year", a money format as "$xxxx.yy", and the like. The DLMD app 509 or another app installed on the smartphone may include the EDI functions. Examples of EDI systems include Fishbowl™ and TrueCommerce EDI™.

In various embodiments, when the user clicks on the order button 713, the EDI functions that perform various formatting and transmission tasks, are activated, taking the data stored in the shopping cart 712, putting the in EDI format and transmitted to the selected store. The EDI functions may use network and/or cellular data transmission functions available on the smartphone. Once the order is transmitted to the store, the construction project product ordering process using the DLMD app 509 is complete.

Figure 7B:
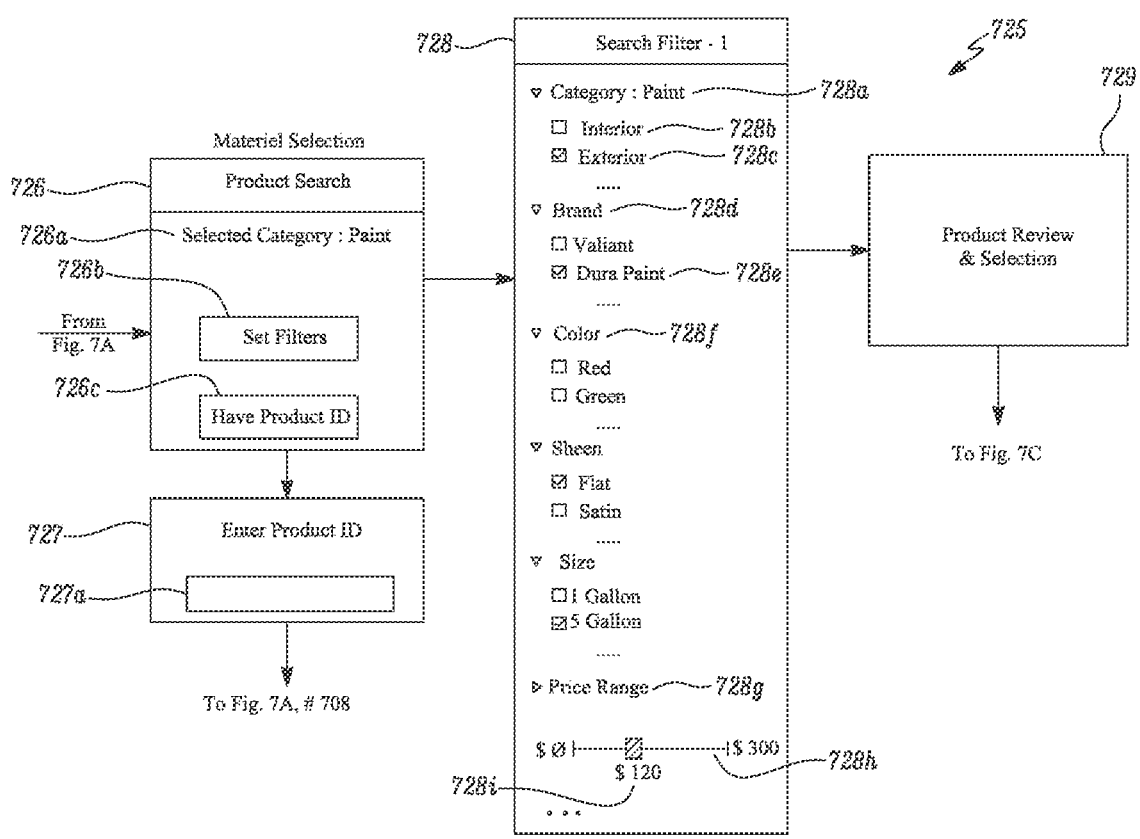
FIG. 7B shows example DLMD app product search and search filters screens.

FIG. 7B shows example DLMD app product search and search filters screens 725. In various embodiments, product search and search filter screens 725 include a product search screen 726 having a product category 726a, a set filters button 726b and a product ID button 726c. A product ID screen 727 including a ID entry field 727a is presented upon activating the product ID button 726c. A first search filters screen 728 includes an identification of product category 728a and search criteria related to the particular product category selected. The first search filters screen 728 shows an example set of search filters relevant to "Paint" category, including selectable search options Interior paint 728b, Exterior paint 728c, Brand 728d listing specific brands including a selected brand 728e, Color 728f, and Price Range 728g having a price range 728h and a selected price 728i, among other relevant search filters for the listed product category 728a. A product review and selection super-screen 729 is also included and further described with respect to FIG. 7C.

In various embodiments, the product search screen 726 displays the previously selected and saved product category that is retrieved and displayed automatically by the DLMD app 509. To search products, the user may first use the set filters button 726b to transition to the first search filter, a preliminary set of search criteria related to and associated with the product category selected 726a, same as 728a. Generally, each search criterion has a type and a value. For example, one criterion for paint product category has type "Color," which can take on different values such as "Green," "Red," "White," and the like. Another example is criterion type "Sheen" with values "Flat," "Satin," and the like. In this screen the user may select various values for the search criteria, for example, by checking a checkbox next to the value under the criterion type. Some criteria may have a continuous range of values, while other criteria have discrete values. Examples, of discrete value criteria are Color and Sheen mentioned above. An example of a continuous value criterion is price. For these criteria, a continuous range of values, which can be presented as a slider 728h, may be used. The slider may be set by user to a desired price selection 728i, signifying a price point. The product search criteria are automatically determined by the DLMD app 509 based on the product type selection and presented to the user on this screen for setting the search criteria.

In various embodiments, the product ID entry screen 727 is presented if the user clicks on the product ID button 726c in product search screen 726. The product ID entry field 727a may be used to enter a known product identifier (ID), such as SKU number, manufacturer product number, or other identification that can fully specify a product and distinguish it from any other product. This case may be useful when a user has previously purchased a product and wants to re-order the same product for another project. If the user knows what product is needed then the product search filters will be bypassed and the user can transition directly to product selection and purchase. Otherwise, the user will use the first search filters 728 for the selected product category to set search criteria, search for the products that meet the selected criteria, and make specific product selections from the search results.

Figure 7C:
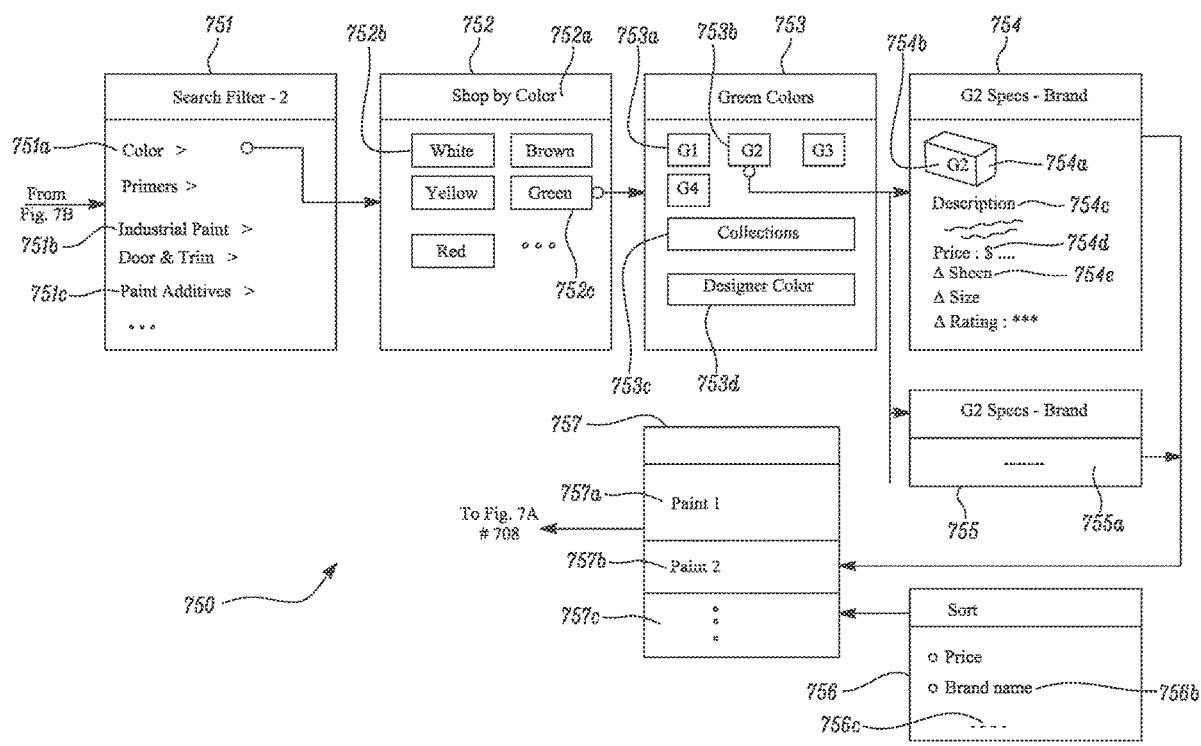
FIG. 7C shows example DLMD app product selection screens.

FIG. 7C shows example DLMD app product selection screens 750. In various embodiments, product selection screens 750 include a second search filter screen 751 showing an example list of criteria relevant to "Paint" product category, previously selected by the user and save by DLMD app 509, including Color 751a, Industrial Paint 761b, Paint Additives 751c, and other similar and related criteria. Shop by color screen 752 includes title indicating which of the several search criteria the use has selected for further refinement of search, a number of colors 752b for selection, and a selected color 752c. The next level search refinement green colors screen 753 shows an example color of green having been chosen and presents further shades of the green color 753a and a selected a green shade 753b. This screen may further present a color collection button or hotlink 753c, and a designer color button 753d. A selected color causes a specification screen 754 to be loaded. The example specification screen 754 shows a shade of green 753b applied to walls 754a and 754b of a room to help user visualize the color as applied to a room. The example specification screen 754 further includes a description 754c, price 754d, paint sheen 754e, container size, rating, and other associated and useful attributes of the product selected. These attributes shown on each screen vary with the product type, as further described below. The search criteria selected by the user up to this stage may match more than one product. So, several sets of specifications 755 may be shown on the specification screen 754 with their own sets of specifications 755a. A sort screen 756 listing several sorting criteria, such as sort by price 756a, Brand name 756b, and other sorting criteria 756c, may be applied to the search results to place them in an order preferred by the user for easy review and selection. A choices screen 757 may be presented that shows the results of the application of sorting criteria, in this example being Paint-1 757a, Paint-2 757b, and other sorted products 757c.

In various embodiments, second search filter 751 is adapted to display secondary search criteria, in addition to those of the first search criteria 728 used to filter products, for different product types. That is, the first and second search filters will present criteria suitable for each product type. For example, if the product type is "Paint", the criteria are similar to those given in the example above, while if the product type is "Plumbing", the search filter and criteria may include pipe diameter, pipe length, pipe material (e.g., copper, steel, plastic, etc.), and the like, none of which are applicable to paint products.

In various embodiments, the further levels of search criteria, such as screens 752 and 753, are more detailed and refined criteria related to the original product category, and adapted for each product type. For example, if the original product category was "Lumber", then the more detailed search criteria may include type of wood such as Birch or Maple. In general, first search filter screen 728 (FIG. 7B), second search filter screen 751, shop by color 752 (example), and green colors screen 753 (example) form a multi-level hierarchy of filters that provide ever more specific search criteria, each of the multiple levels configured and presented based on the higher level criteria. The higher level criteria are general and first in time, while the lower level criteria are more detailed and later in time. For example, First, a high-level product category "Paint" is selected, then the next level criterion "color" is chosen, such as green, and then a more detailed criterion like "shade" of green is selected.

In various embodiments, the specifications screen 754 is also adapted to present the information about any product that matches all criteria in all levels of the hierarchical filters. In most cases, the specifications screen 754 will have multiple products and corresponding specifications.

Figure 8:
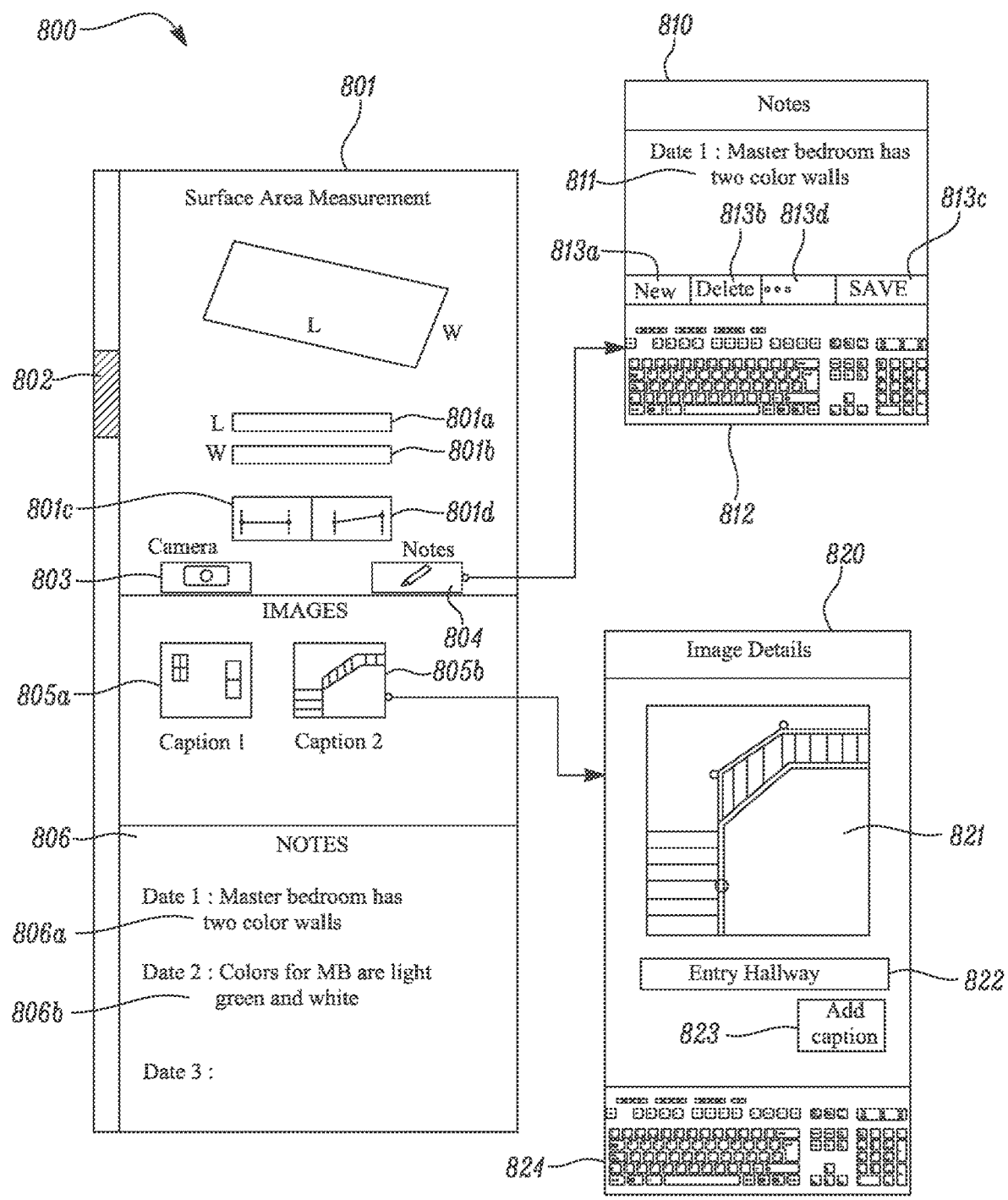
FIG. 8 shows example DLMD app image and annotation creation screens.

FIG. 8 shows example DLMD app image and annotation creation screens 800. The image and annotation creation screens 800 include a measurement screen 801 having a scroll bar 802 for scrolling up and down a long app screen that may not fit entirely on the smartphone screen, measurement fields 801a and 801b, measurement mode buttons 801a and 801b, camera button 803, notes button 804, images 805a and 805b, and notes area 806 with notes 806a and 806b. The image and annotation creation screens 800 may further include a note editing screen 810 used to enter or edit annotations for measurement, a note editing area 811, a new note button 813a, a note delete button 813b, a note save button 813c, other note editing buttons 813d, and a software keyboard element 812. The image and annotation creation screens 800 may further include an image details screen 820 used to view images and enter or edit image captions, a selected image area 821, an image caption field 822, an add image caption button 823, and a software keyboard element 824.

Even though the image and annotation creation screens 800 are shown in a separate figure to enhance clarity, it is to be understood that all the elements and functionalities shown and described with respect to the screens 801, 810, and 820 may be integrated with or be an integral part of all the measurement screens in the previous figures. This is because the addition of images, annotations, descriptions, or captions may accompany any measurement of any type, whether entered manually or obtained by laser measurement. Hence, in some embodiments, all the measurement screens shown herein are to be interpreted as having the additional elements (but not duplicating elements, like mode selection buttons 810c and 810d) shown in FIG. 8, including camera button 803, notes button 804, images 805a 805b, and notes area 806 and notes 806a and 806b, and other additional elements shown on screens 810 and 820, integrated on the same measurement screen or providing indirect access to such additional elements via hotlinks or screen navigation buttons or other GUI navigation elements. For example, the measurement screens depicted in FIGS. 6D, 6F, 6G, and 6H may, in some embodiments, have the elements shown in these figures in addition to the elements depicted in FIG. 8. The surface area measurement screen 801 is shown as a representative example of measurement. The same configuration having the images and notes features may be deployed in any one of the other measurement screens.

In various embodiments, once a user accesses one of the measurement screens shown in FIGS. 6D, 6F, 6G, and 6H, which have the images and notes features, may use the camera button 803 to take pictures of the measurement area. For example, if the user is measuring a length (1-D) of hallway, a surface (2-D) of a wall, or room dimensions (3-D), by pressing the camera button 803 the user may also take a picture of the hallway, the wall, or the room being measured. One or more pictures may be taken for each measurement. The images 805a and 805b and other images resulting from taking pictures may be stored in the database 654 and associated with the measurements taken and the corresponding products selected, as described earlier. These pictures may also be displayed as thumbnail images along with the measurements and other data on the screen 801. The scroll bar 802 may be used to move the screen contents up and down to view various parts of the screen such as the images and notes.

In various embodiments, the details of the images may be viewed in a separate screen 820. For example, the user may click on image 805b to view an enlarged version 821 of image 805b that may reveal some details that may not be visible in a thumbnail image. The add caption button 823 may be used to create a caption for the image using keyboard 824 or other input device. The caption will also appear on the measurement screen 801 next to the corresponding image.

In various embodiments, the notes button 804 may be used to add notes and annotations to the measurement taken in any of the measurement screens. Clicking on the notes button 804 may launch the note editing screen 810 to type or create note 811. Once in the note editing screen 810, pressing the new button 813a allows the creation of a new note, using keyboard 812 or other input methods, that will appear in the notes area 806 once saved using the save button 813c. Any number of notes may be created. Notes may also be deleted using the delete button 813b. Other common editing buttons 813d may be deployed on this screen as well, such as font selection, text effects like bold and italics, underlining, formatting, and the like.

Figure 9A:
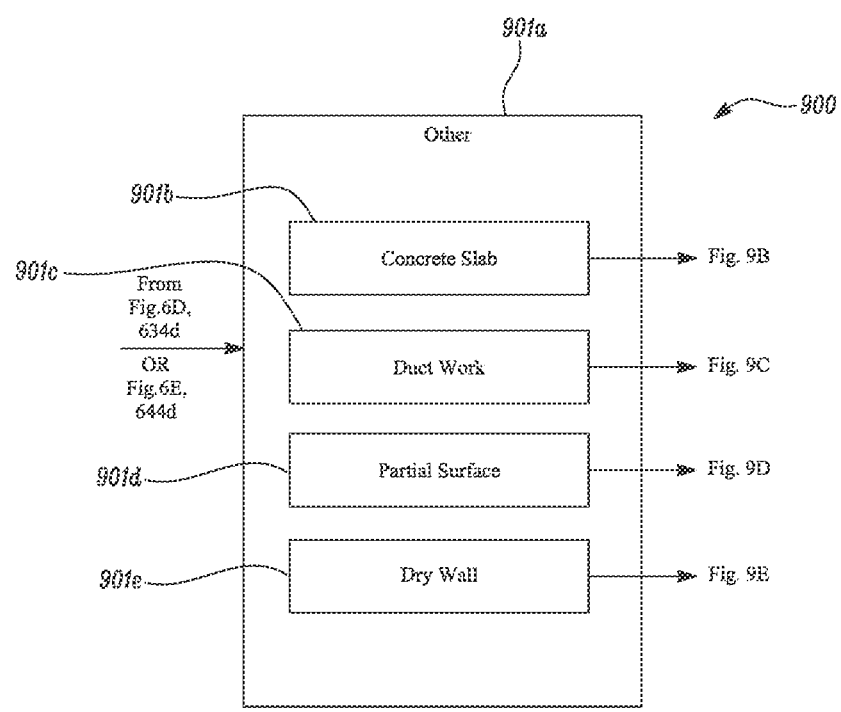
FIG. 9A shows an example DLMD app other measurement selection screen.

FIG. 9A shows an example DLMD app other measurement selection screen 900. To avoid confusion, the term "other" as used in the context of measurement herein means other types of measurement than those explicitly described earlier (for example, see FIG. 6D) as length (1-D), surface (2-D), and room dimensions (3-D). In various embodiments, other measurement selection screen 900 includes screen 901a having selection buttons 901b-901e. Button 901b is used to select concrete slab measurement, button 901c is used to select ductwork measurement, button 901d is used to select partial surface measurement, and button 901e is used to select drywall measurement.

In various embodiments, each of the buttons 901b-901e lead to a different screen used for the measurement of the respective other type of measurement as indicated. Each of the other measurement screens, shown in FIGS. 9B-9E, may be considered as a specific instance or version of screen 635d shown in FIG. 6D. The other measurement types shown in FIGS. 9B-9E are examples of other types of measurements. Additional other types of measurements may be added without departing from the spirit of the disclosures herein.

The other measurement types, including those that are disclosed herein and similar types not described, are different from the 1-D, 2-D, and 3-D measurement types in that not all dimensions of the other measurement types are explicitly measured. Rather, some of the dimensions of the other measurement types are implicit, standard, assumed, default or otherwise determined without actual and direct measurement. In the 1-D, 2-D, and 3-D measurements, all dimensions that are needed are explicitly measured, using the laser device or manually, and entered into the respective data fields. For example, to measure a surface area of a wall or a floor, both length and width dimensions are measured. While in the other measurement types described below with respect to FIGS. 9B-9E, some needed measurements are not taken but assumed to have a particular value. For example, to determine how much concrete a foundation may need, only the width and length of the foundation are measured and the thickness (or height/depth) of the concrete slab is assumed to have a standard value such as four inches or six inches. These implicit measurements may be included in data files, such as configuration or initialization files, used by the DLMD app 509 during the installation or initialization of the app. These implicit or standard measurements are generally associated with the appropriate and particular type of measurement and/or product and is used when the particular type of measurement is used. Such implicit measurements may be periodically updated or configured in the DLMD app 509 by the user prior to usage of the app for measurement.

Figure 9B:
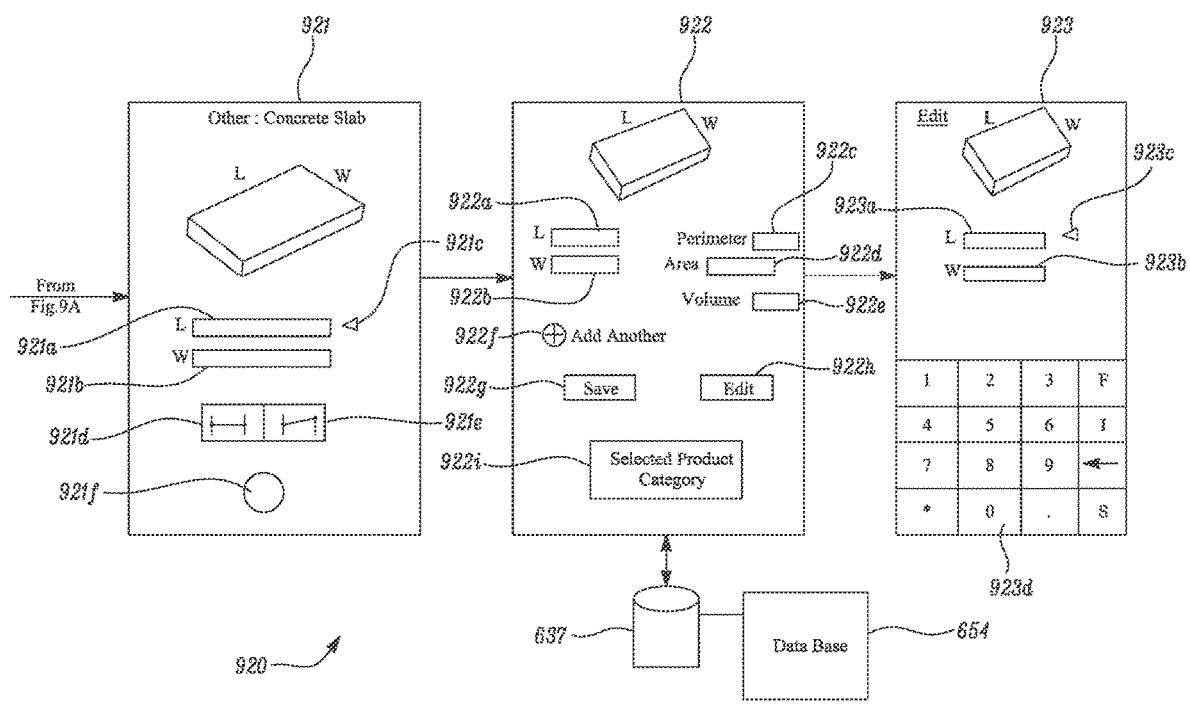
FIG. 9B shows example DLMD app other-concrete slab measurement screens.

FIG. 9B shows example DLMD app other-concrete slab measurement screens 920. In various embodiments other-concrete slab measurement screens 920 include a measurement screen 921 having a length field 921a, a width field 921b, a field selection indicator 921c, measurement mode selection buttons 921d and 921e, and laser beam activation button 921f. Data presentation screen 922 includes a length data field 922a, a width data field 922b, a perimeter calculated or derived field 922c, a surface area calculated field 922d, a volume calculated field 922e, an add button 922f to add more length and width data fields, a save button 922g, an edit button 922h, and a select product category 922i. An Edit screen 923 includes a length data entry edit field 923a, a width data entry edit field 923b, a data field selection indicator 923c, and a keypad 923d. The data storage 637 is used to store and save measured length data in the database 654 having various fields, as described above with respect to FIG. 6F (not repeated in this figure).

In various embodiments, the laser activation screen 921 is the first screen the user encounters in this type of the measurement. Measurement mode buttons 921d and 921e are used to specify which one of the two modes of measurement the user wants to use. The two modes include a perpendicular measurement mode and a point-to-point mode, as described above with respect to FIG. 6F. Even though in a 2-D type of measurement, more than one measurement is taken, but each measurement is a linear distance measurement (length or width) and the measurement mode is applicable. Therefore, the mode options are provided for most or all types of measurements.

In various embodiments, the field selection indicator 921c indicates which of the two data fields 921a and 921b is selected as the next dimension to be measured. A data field may be selected by various methods in a GUI environment, such as clicking on the field or using selection arrows (not shown). Once the data field is selected for measurement, the laser activation button 921f is activated by the user by clicking on it to start the actual laser measurement. The user will hold the DLMD device at a place between the points to be measured, as depicted in FIGS. 3, 4C and 4D, and click on the laser activation button 921f to measure and record the distance. This procedure is repeated by the user for each dimension to be measured and for additional dimensions added for additional measurements, such as performing the same measurement for another nearby space, using the add another button 922f.

In various embodiments, the default or implicit dimension for the other-concrete slab is its depth or thickness, which remains uniform over its surface area. For different construction projects and applications the thickness of the concrete slab may be different. For example, for a driveway, the slab may be four inches thick, while for a multistory building or a parking structure, the foundation concrete slab may be several feet thick. Several default values may be stored in the data files of the DLMD app 509 from which the user may pick one for the project at hand to be used when the other-concrete slab measurements are being taken.

In various embodiments, once the laser activation button 921f is pressed and the measurement is taken, the data presentation screen 922 appears on the smartphone to show the value of the measurement in data fields 922a and 922b. The derived dimensions 922c-922e are also calculated and displayed. In the case of a concrete slab measurement, the derived dimensions may include perimeter of the space being measured, the surface area, such as floor area, and the volume of the concrete needed, which are calculated based on the measured numbers in data fields 922a and 922b, and also the implicit or default concrete slab thickness measurement that is stored in app data files and provided by DLMD app 509.

In various embodiments, the save button 922g is used by the user to store and save the measurement obtained and the derived dimensions values in the database measurement history 654. In some embodiments, all or some measurements may be saved automatically based on configuration settings in the DLMD app 509 (see FIG. 5). In some embodiments, such configuration settings may be built-in for some app versions, while in other embodiments, the configuration settings may be changed by the user.

In various embodiments, the edit button 922h may be used by the user to edit the measurements taken by the DLMD. This feature may be useful when the user knows something about the space being measured, or for other reasons, that is not reflected in the laser measurement. For example, if the space being measured is not rectangular and has some corners that are not included in the measurement of the space, the user can enter slightly larger numbers to purchase more materials to cover the corners not measured.

In various embodiments, once the edit button 922h is clicked, edit screen 923 is presented to provide a UI for the user to edit the measurements. Initially the data fields 923a and 923b with the measured values are displayed. The user can use keypad 923d to edit the number displayed in data fields 923a and 923b. The user may select one of the data entry fields 923a and 923b by various GUI methods, such as clicking on the data fields or moving the data selection indicator 923c to the desired data field.

In various embodiments, the database measurement history 654 is as described above with respect to FIG. 6F.

In various embodiments, the select product category selection button 922i may be used by the user if the path taken, with reference to FIG. 6A, did not go through super-screen (or screen set) 603 to select product category before attempting measurements. If the user has already selected product category, then the product category selection button 922i may be set to an inactive status ("grayed out", as is conventionally known) by the MLMD app, or it may simply not be used by the user.

Figure 9C:
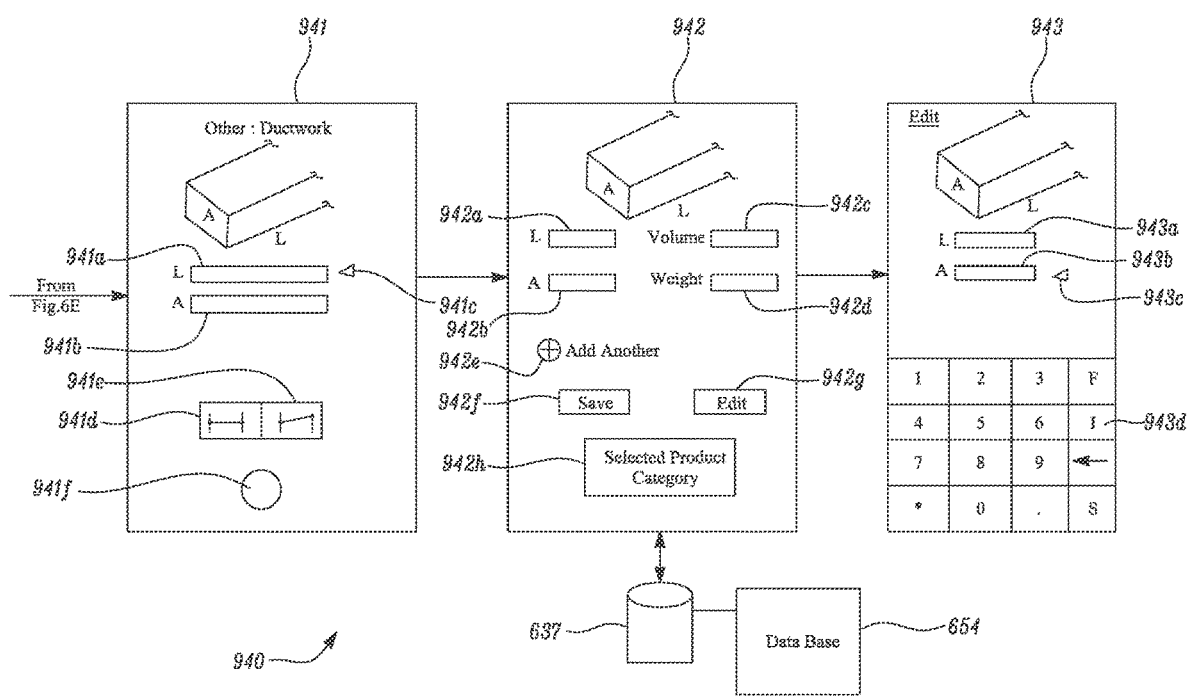
FIG. 9C shows example DLMD app other-ductwork measurement screens.

FIG. 9C shows example DLMD app other-ductwork measurement screens 940. In various embodiments other-ductwork measurement screens 940 include a measurement screen 941 having a length field 941a and a manually entered area field 941b, a field selection indicator 941c, measurement mode selection buttons 941d and 941e, and laser beam activation button 941f. Data presentation screen 942 includes a length data field 942a, a manually entered data field 942b, a volume calculated field 942c, a weight calculated field 942d, an add button 942e to add more length and width data fields, a save button 942f, an edit button 942g, and a select product category 942h. An Edit screen 943 includes a length data entry edit field 943a, an area data entry edit field 943b, a data field selection indicator 943c, and a keypad 943d. The data storage 637 is used to store and save measured length data in the database 654 having various fields, as described above with respect to FIG. 6F (not repeated in this figure).

In various embodiments, the laser activation screen 941 is the first screen the user encounters in this type of the measurement. Measurement mode buttons 941d and 941e are used to specify which one of the two modes of measurement the user wants to use. The two modes include a perpendicular measurement mode and a point-to-point mode, as described above with respect to FIG. 6F.

In various embodiments, the field selection indicator 941c indicates which of the two data fields 941a and 941b is selected as the next dimension to be measured or manually filled in. As noted previously, a data field may be selected by various methods in a GUI environment, such as clicking on the field or using selection arrows (not shown). Once the data field is selected for measurement, the laser activation button 941f is activated by the user by clicking on it to start the actual laser measurement. The user will hold the DLMD device at a place between the points to be measured, as depicted in FIGS. 3, 4C and 4D, and click on the laser activation button 941f to measure and record the distance. This procedure is repeated by the user for each dimension to be measured and for additional dimensions added for additional measurements, such as performing the same measurement for another nearby space, using the add another button 942e.

In various embodiments, the default or implicit dimension for the other-ductwork is its area and weight per linear foot, which remains uniform over its length, or at least over each section of its length. For different construction projects and applications the area and weight density (weight per linear foot) of the ductwork may be different. For example, for a single family home, the ductwork area may be one square foot, while for a commercial building or a bigger house, the ductwork area may be two square feet. Several default values may be stored in the data files of the DLMD app 509 from which the user may pick one for the project at hand to be used when the other-ductwork measurements are being taken.

In various embodiments, once the laser activation button 941f is pressed and the measurement is taken, the data presentation screen 942 appears on the smartphone to show the value of the measurement in data fields 942a and 942b. The derived dimensions 942c and 942d are also calculated and displayed. In the case of a other-ductwork measurement, the derived dimensions may include the volume of ductwork per unit length for the space being measured and the weight (density or total), which are calculated based on the measured numbers in data field 942a and manually entered field 942b, and also the implicit or default ductwork measurement that is stored in app data files and provided by DLMD app 509.

In various embodiments, the save button 942f is used by the user to store and save the measurement obtained and the derived dimensions values in the database measurement history 654. In some embodiments, all or some measurements may be saved automatically based on configuration settings in the DLMD app 509 (see FIG. 5). In some embodiments, such configuration settings may be built-in for some app versions, while in other embodiments, the configuration settings may be changed by the user.

In various embodiments, the edit button 942g may be used by the user to edit the measurements taken by the DLMD. This feature may be useful when the user knows something about the space being measured, or for other reasons, that is not reflected in the laser measurement. For example, if the space being measured is not rectangular and has some corners that are not included in the measurement of the space, the user can enter slightly larger numbers to purchase more materials to cover the corners not measured.

In various embodiments, once the edit button 942g is clicked, edit screen 943 is presented to provide a UI for the user to edit the measurements. Initially the data fields 943a and 943b with the measured values and entered values, respectively, are displayed. The user can use keypad 943d to edit the number displayed in data fields 943a and 943b. The user may select one of the data entry fields 943a and 943b by various GUI methods, such as clicking on the data fields or moving the data selection indicator 943c to the desired data field.

In various embodiments, the database measurement history 654 is as described above with respect to FIG. 6F.

In various embodiments, as noted above, the select product category selection button 942h may be used by the user if the path taken, with reference to FIG. 6A, did not go through super-screen (or screen set) 603 to select product category before attempting measurements. If the user has already selected product category, then the product category selection button 942h may be set to an inactive status ("grayed out", as is conventionally known) by the MLMD app, or it may simply not be used by the user.

Figure 9D:
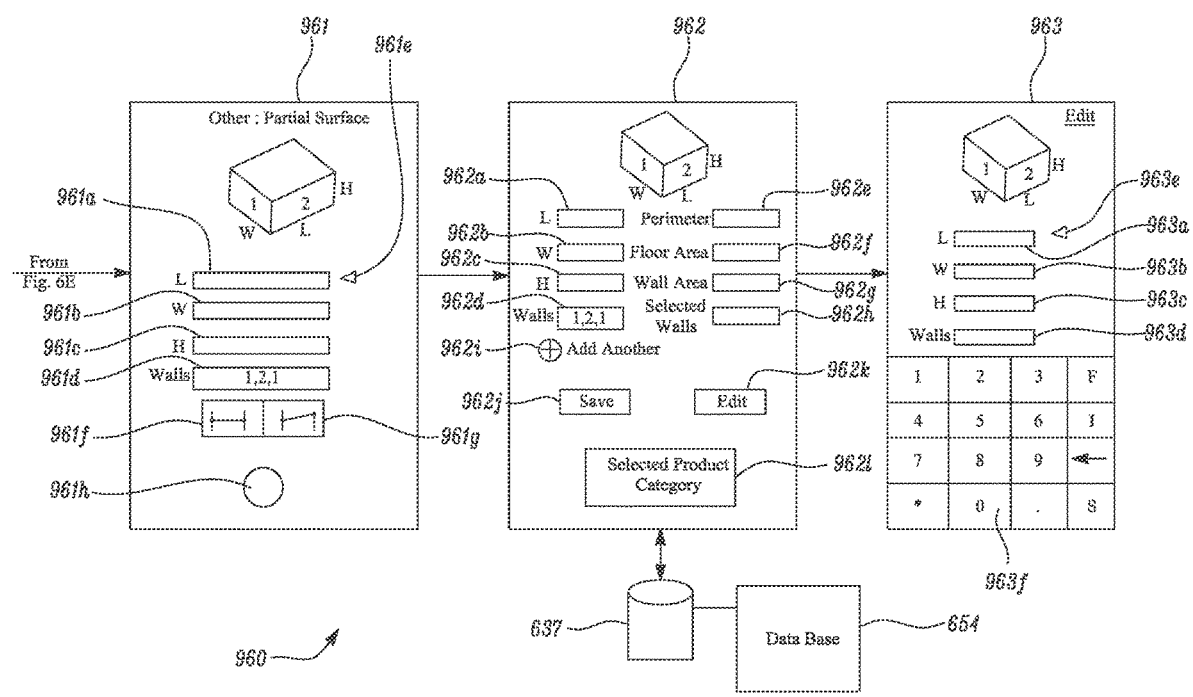
FIG. 9D shows example DLMD app other-partial surface measurement screens.

FIG. 9D shows example DLMD app other-partial surface measurement screens 960. In various embodiments other-partial surface measurement screens 960 include a measurement screen 961 having a length field 961a, a width field 961b, a height data field 961c, and a manually entered wall selection field 961d, a field selection indicator 961e, measurement mode selection buttons 961f and 961g, and laser beam activation button 961h. Data presentation screen 962 includes a length data field 962a, a width data field 962b, a height data field 962c, a manually entered wall selection data field 962d, a perimeter calculated field 962e, a floor area calculated field 962f, a wall area calculated field 962g, a selected walls manually entered field 962h, an add button 962i to add more length, width, height, and wall selection data fields, a save button 962j, an edit button 962k, and a select product category 962l. An Edit screen 963 includes a length data entry edit field 963a, a width data entry edit field 963b, a height data entry edit field 963c, a manually entered wall selection data entry edit field 963d, a data field selection indicator 963e, and a keypad 963f. The data storage 637 is used to store and save measured length data in the database 654 having various fields, as described above with respect to FIG. 6F (not repeated in this figure).

In various embodiments, the laser activation screen 961 is the first screen the user encounters in this type of the measurement. Measurement mode buttons 961f and 961g are used to specify which one of the two modes of measurement the user wants to use. The two modes include a perpendicular measurement mode and a point-to-point mode, as described above with respect to FIG. 6F.

In various embodiments, the field selection indicator 961e indicates which of the four data fields 961a-961d is selected as the next dimension to be measured or manually filled in. As noted previously, a data field may be selected by various methods in a GUI environment, such as clicking on the field or using selection arrows (not shown). Once the data field is selected for measurement, the laser activation button 961h is activated by the user by clicking on it to start the actual laser measurement. The user will hold the DLMD device at a place between the points to be measured, as depicted in FIGS. 3, 4C and 4D, and click on the laser activation button 961h to measure and record the distance. This procedure is repeated by the user for each dimension to be measured and for additional dimensions added for additional measurements, such as performing the same measurement for another nearby space, using the add another button 962i.

In various embodiments, other-partial surface has no the default or implicit dimensions that are used in measurement. Instead, the user may use the wall selection field 961d to enter a selection of walls numbered in a predetermined order. Even though a whole room or space may be measured, the selected walls are the ones that need some material category, such as paint. The walls may be numbered as shown in the figure or using any other predetermined numbering convention. The non-measured default or implicit values used to calculate the derived or calculated values, such as selected wall area data field 962*h* are included in the wall selection field 961*d*. It will be appreciated that even though the other-partial surface example described here with respect to FIG. 9D, partial wall surfaces are described, but other partial surfaces such as ceilings, floors, counter tops may also be measured. For each type of partial surface, such as walls, floors, and the like, a different DLMD app 509 screen may be needed. Alternatively, the same partial surface screen 961 may be used but with additional buttons or dropdown lists that may be used to select which type of partial surface is to be measured. Depending on the selection of the partial surface type, the numbering convention may be different, or a different specification method may be used to specify which part of the surface is to be used for measurement and/or purchase of material to cover the surface. The material may be paint, carpet, or other surface-related types of material and products.

In various embodiments, once the laser activation button 961*h* is pressed and the measurement is taken, the data presentation screen 962 appears on the smartphone to show the value of the measurement in data fields 962*a*-962*d*. The derived dimensions or values 962*e*-962*h* are also calculated and displayed. In the case of an other-partial surface measurement, the derived dimensions may include the perimeter of the room, the floor area, the wall area, and the selected walls area, which are calculated based on the measured numbers in data fields 962*a*-962*c* and manually entered field 962*d*.

In various embodiments, the save button 962*l* is used by the user to store and save the measurement obtained and the derived dimensions values in the database measurement history 654. In some embodiments, all or some measurements may be saved automatically based on configuration settings in the DLMD app 509 (see FIG. 5). In some embodiments, such configuration settings may be built-in for some app versions, while in other embodiments, the configuration settings may be changed by the user.

In various embodiments, the edit button 962*k* may be used by the user to edit the measurements taken by the DLMD. This feature may be useful when the user knows something about the space being measured, or for other reasons, that is not reflected in the laser measurement. For example, if the space being measured is not rectangular and has some corners that are not included in the measurement of the space, the user can enter slightly larger numbers to purchase more materials to cover the corners not measured.

In various embodiments, once the edit button 962*k* is clicked, edit screen 963 is presented to provide a UI for the user to edit the measurements. Initially the data fields 963*a*-963*d* with the measured values and entered values are displayed. The user can use keypad 963*f* to edit the number displayed in data fields 963*a*-963*d*. The user may select one of the data entry fields 963*a*-963*d* by various GUI methods, such as clicking on the data fields or moving the data selection indicator 963*f* to the desired data field.

In various embodiments, the database measurement history 654 is as described above with respect to FIG. 6F.

In various embodiments, as noted above, the select product category selection button 962*l* may be used by the user if the path taken, with reference to FIG. 6A, did not go through super-screen (or screen set) 603 to select product category before attempting measurements. If the user has already selected product category, then the product category selection button 962*l* may be set to an inactive status ("grayed out", as is conventionally known) by the MLMD app, or it may simply not be used by the user.

Figure 9E:
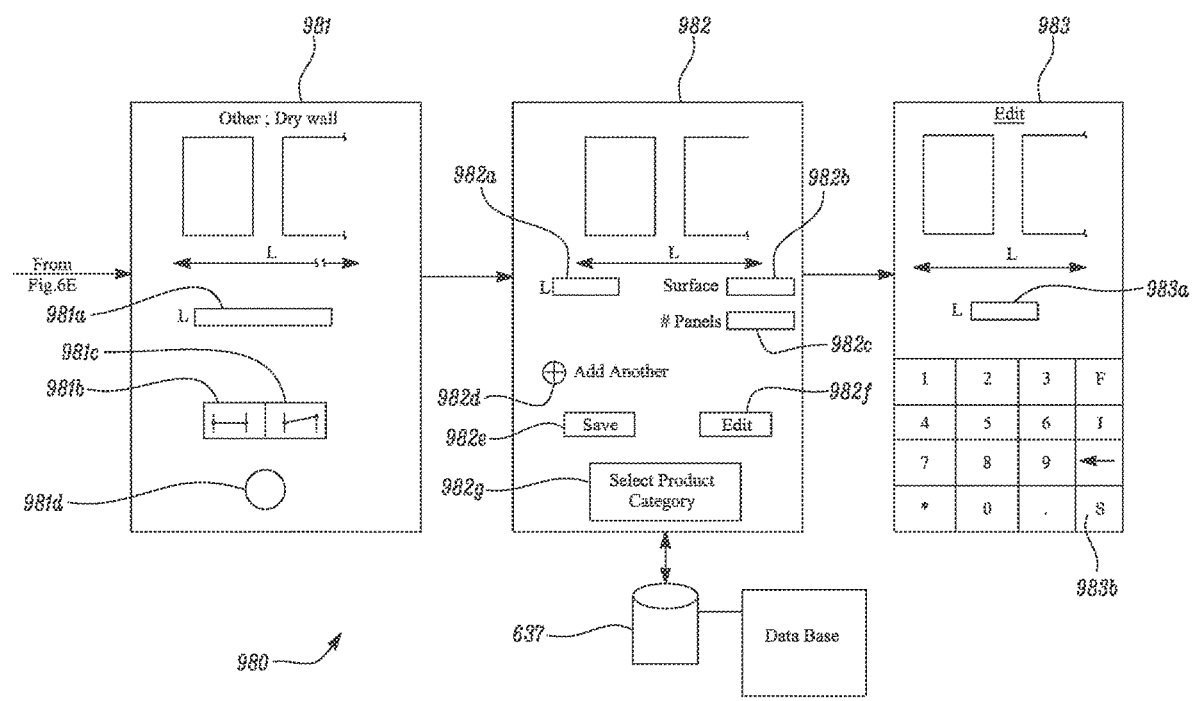
FIG. 9E shows example DLMD app other-drywall measurement screens.

FIG. 9E shows example DLMD app other-drywall measurement screens 980. In various embodiments other-drywall measurement screens 980 include a measurement screen 981 having a length field 981*a*, measurement mode selection buttons 981*b* and 981*c*, and laser beam activation button 981*d*. Data presentation screen 982 includes a length data field 982*a*, a surface area calculated or derived field 982*b*, a number of panels calculated field 982*c*, an add button 982*d* to add more length data fields, a save button 982*e*, an edit button 982*f*, and a select product category 982*g*. An Edit screen 983 includes a length data entry edit field 983*a* and a keypad 983*b*. The data storage 637 is used to store and save measured length data in the database 654 having various fields, as described above with respect to FIG. 6F (not repeated in this figure).

In various embodiments, the measurement screen or laser activation screen 981 is the first screen the user encounters in this type of the measurement. Measurement mode buttons 981*b* and 981*c* are used to specify which one of the two modes of measurement the user wants to use. The two modes include a perpendicular measurement mode and a point-to-point mode, as described above with respect to FIG. 6F.

In various embodiments, the laser activation button 981*d* may be activated by the user by clicking on it to start the actual laser measurement. The user will hold the DLMD device at a place between the points to be measured, as depicted in FIGS. 3, 4C and 4D, and click on the laser activation button 981*d* to measure and record the distance. This procedure is repeated by the user for each dimension to be measured and for additional dimensions added for additional measurements, such as performing the same measurement for another nearby space, using the add another button 982*d*.

In various embodiments, the default or implicit dimension for the other-drywall is its panel width and panel thickness, which are generally available in standard prefabricated sizes. For different construction projects and applications the size and type (length, width, thickness, and material) of the drywall panels may be different. For example, for a personal house, the drywall panels may be 4'×8' (4 foot by 8 foot) constructed from sheetrock or gypsum, while for a commercial facility or building, the panels be bigger and thicker and be constructed of glass-fiber reinforced material for fire resistance. Several default values for each of the panel length and thickness dimensions may be stored in the data files of the DLMD app 509 from which the user may pick one for the project at hand to be used when the other-drywall measurements are being taken.

In various embodiments, once the laser activation button 981*d* is pressed and the measurement is taken, the data presentation screen 982 appears on the smartphone to show the value of the measurement in data field 982*a*. The derived dimensions 982*b* and 982*c* are also calculated and displayed. In the case of a drywall measurement, the derived dimensions may include total surface area and the number of panels needed to cover the surface area. The implicit or default panel width that is stored in app data files and provided by DLMD app 509 may be used to determine the number of panels of the default width that is required to cover the measured length 981*a*.

In various embodiments, the save button 982*e* is used by the user to store and save the measurement obtained and the derived dimensions values in the database measurement history 654. In some embodiments, all or some measurements may be saved automatically based on configuration settings in the DLMD app 509 (see FIG. 5). In some embodiments, such configuration settings may be built-in for some app versions, while in other embodiments, the configuration settings may be changed by the user.

In various embodiments, the edit button 982*f* may be used by the user to edit the measurements taken by the DLMD. This feature may be useful when the user knows something about the space being measured, or for other reasons, that is not reflected in the laser measurement. For example, if the space being measured is not rectangular and has some corners that are not included in the measurement of the space, the user can enter slightly larger numbers to purchase more materials to cover the corners not measured.

In various embodiments, once the edit button 982*h* is clicked, edit screen 983 is presented to provide a UI for the user to edit the measurements. Initially the data field 983*a* with the measured values is displayed. The user can use keypad 983*b* to edit the number displayed in data fields 983*a*.

In various embodiments, the database measurement history 654 is as described above with respect to FIG. 6F.

In various embodiments, the select product category selection button 982*g* may be used by the user if the path taken, with reference to FIG. 6A, did not go through super-screen (or screen set) 603 to select product category before attempting measurements. If the user has already selected product category, then the product category selection button 982*g* may be set to an inactive status ("grayed out", as is conventionally known) by the MLMD app, or it may simply not be used by the user.

It will be understood that each step of the processes described above, and combinations of steps, may be implemented by computer program instructions. These program instructions may be provided to a processor to produce a machine, such that the instructions, which execute on the processor, enable implementing the actions specified. The computer program instructions may be executed by a processor to cause a series of operational steps to be performed by the processor to produce a computer implemented process such that the instructions, which execute on the processor to provide steps for implementing the actions. The computer program instructions may also cause at least some of the operational steps to be performed in parallel. Moreover, some of the steps may also be performed across more than one processor, such as might arise in a multi-processor computer system. In addition, one or more steps or combinations of steps described may also be performed concurrently with other steps or combinations of steps, or even in a different sequence than described without departing from the scope or spirit of the disclosure.

Accordingly, steps of processes or methods described support combinations of techniques for performing the specified actions, combinations of steps for performing the specified actions and program instruction for performing the specified actions. It will also be understood that each step, and combinations of steps described, can be implemented by special purpose hardware based systems which perform the specified actions or steps, or combinations of special purpose hardware and computer instructions.

It will be further understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. An integrated system for construction product acquisition, the system comprising:
   a mobile communication and computing device;
   a multi-laser device coupled with the mobile communication and computing device via a data interface;
   a laser software application (laser app) installed on the mobile communication and computing device, the laser app including:
      a laser activation software routine to cause the multi-laser device to cast laser beams in different directions, the different directions defined by pre-determined angles, to measure a distance between two distant surfaces;
      a laser beam pyramid-based triangulation software routine to calculate a perpendicular distance between surfaces that include the two distant surfaces based on the pre-determined angles; and
      a data entry software routine to allow automatic data acquisition using laser beams generated by the multi-laser device, manual data entry, or a combination of both.

2. The system of claim 1, further comprising a plurality of laser light sources and corresponding laser light detectors deployed within the dual laser device.

3. The system of claim 2, wherein each of the plurality of laser light sources emit a laser beam with a non-zero angle with respect to each of the other of the plurality of laser light sources.

4. The system of claim 1, further comprising a data storage device having a database thereon to store data provided by the laser app.

5. The system of claim 1, further comprising a product category selection interface to select a product category for a construction project.

6. The system of claim 5, wherein the product category selection interface provides option to select one of paint, lumber, plumbing, flooring, ductwork, concrete, and drywall product categories.

7. The system of claim 1, wherein the laser app further comprises an interface to select a measurement type.

8. The system of claim 7, wherein the interface to select a measurement type provides a one-dimensional measurement, a two-dimensional measurement, and a three-dimensional interface.

9. A measurement device comprising:
   a laser measurement attachment coupled with a mobile communication and computing device; and
   at least one photodetection unit coupled to opposite sides of the laser measurement attachment, the at least one photodetection unit to cast a plurality of laser beams, each of the plurality of laser beams cast at different predetermined angles with respect to the other laser beams, the plurality of laser beams usable to calculate a perpendicular distance between two distant surfaces using a pyramid-based triangulation method based on the predetermined angles and the plurality of laser beams forming sides of the pyramid.

10. The measurement device of claim 9, further comprising a plurality of shutters to enable or disable each of the at least one photodetection units.

11. The measurement device of claim 9, wherein the at last one photodetection units comprises a laser light source and a laser detection device.

12. The measurement device of claim 9, wherein several of the at least one photodetection unit are integrated together as a segmented photodetection device, if more than one photodetection unit is used.

13. The measurement device of claim 9, wherein each of the plurality of laser beams has the same light frequency as the other plurality of laser beams.

14. The measurement device of claim 9, wherein each of the plurality of laser beams has a different frequency compared with the other plurality of laser beams.

15. A computer-implemented method for construction products purchase, the method comprising:
   Selecting a product category for measurement using a laser measurement device and a laser software application (laser app) running on a mobile communication and computing device;
   casting a plurality of beams on opposite sides of the dual laser device to collect distance measurements data for the selected product category, each of the plurality of beams cast at a different predetermined angle with respect to other plurality of beams, the distance measurement data including a perpendicular distance between two surfaces calculated using a pyramid triangulation technique based on the predetermined angles;
   transmitting the distance measurement data to the mobile communication and computing device to calculate distance between desired points based on the distance measurement data;
   selecting specific products to purchase using the laser app; and
   purchasing the selected products using the laser app.

16. The computer-implemented method of claim 15, further comprising selecting a measurement type from one of a one-dimensional, two-dimensional, and three-dimensional, other-type measurement types.

17. The computer-implemented method of claim 16, wherein the other-type measurement type includes concrete slab, ductwork, partial surface, and drywall.

18. The computer-implemented method of claim 15, further comprising recording some measurements manually using the laser app.

19. The computer-implemented method of claim 15, further comprising selecting a mode of measurement, the mode of measurement including a perpendicular measurement mode and a point-to-point measurement mode.

20. The computer-implemented method of claim 15, wherein the distance measurements are stored in a measurement history database including product information associated with the distance measurements.

* * * * *